US012742646B2

(12) United States Patent
Hiller

(10) Patent No.: US 12,742,646 B2
(45) Date of Patent: Sep. 22, 2026

(54) GLOBAL COOLING VIA AIRCRAFT

(71) Applicant: The Boeing Company, Arlington, VA (US)

(72) Inventor: Nathan D. Hiller, Irvine, CA (US)

(73) Assignee: The Boeing Company, Arlington, VA (US)

( * ) Notice: Subject to any disclaimer, the term of this patent is extended or adjusted under 35 U.S.C. 154(b) by 93 days.

(21) Appl. No.: 18/643,200

(22) Filed: Apr. 23, 2024

(65) Prior Publication Data

US 2025/0327671 A1 Oct. 23, 2025

(51) Int. Cl.
*G01C 21/20* (2006.01)
*A01G 15/00* (2006.01)

(52) U.S. Cl.
CPC ............. *G01C 21/20* (2013.01); *A01G 15/00* (2013.01)

(58) Field of Classification Search
None
See application file for complete search history.

(56) References Cited

U.S. PATENT DOCUMENTS

2023/0326354 A1* 10/2023 Durant .................... G08G 5/76 701/3

FOREIGN PATENT DOCUMENTS

DE 102012001616 * 8/2013

OTHER PUBLICATIONS

Cuthbert et al., "Circular 'Distrails' on Sep. 25, 1986 Over Northern England," Dec. 1987, pp. 379-383, Royal Meterological Society, accessed Apr. 23, 2024, https://rmets.onlinelibrary.wiley.com/doi/abs/10.1002/j.1477-8696.1987.tb07513.x.

Duda et al., "Observations of aircraft dissipation trails from GOES," Monthly weather review, Feb. 1, 2024, pp. 398-406, vol. 130, ametsoc.org, accessed Apr. 23, 2024, https://journals.ametsoc.org/view/journals/mwre/130/2/1520-0493_2002_130_0398_ooadtf_2.0.co_2.xml.

Franks, "Nucleation of ice and its management in ecosystems," Philosophical Transactions of the Royal Society of London, Jan. 29, 2003, pp. 557-574, accessed Apr. 23, 2024, royalsocietypublishing.org, https://royalsocietypublishing.org/doi/10.1098/rsta.2002.1141.

(Continued)

*Primary Examiner* — Hongye Liang
(74) *Attorney, Agent, or Firm* — Yee & Associates, P.C.

(57) ABSTRACT

A method is provided that enables aircraft to contribute to global cooling by flying at select locations, altitudes, and times. An aircraft will deviate from its planned departure time and flight path to "harvest" prime sections of the atmosphere. Consequently, just as passengers have the option to lower their ticket prices by choosing inconvenient departure times and longer indirect flights, adoption of the method by the airline industry will enable passengers to trade these same options for a lower "environmental price". The method enables the airline industry to switch from a contributor to global warming, to a contributor to global cooling. In this respect, the method enables the airline industry to be a global cooling technology comparable to carbon capture and sequestration. Unlike the immense capital investment required by other global cooling technologies, the method requires no capital investment because it exploits the existing multitrillion-dollar global air transportation infrastructure.

20 Claims, 24 Drawing Sheets

(56) References Cited

OTHER PUBLICATIONS

Hiller, "Aircraft Acceleration Prediction Using Lidar Trained Artificial Intelligence," U.S. Appl. No. 18/496,586, filed Oct. 27, 2023, 83 pages.
Paugam et al., "Influence of vortex dynamics and atmospheric turbulence on the early evolution of a contrail," Atmospheric Chemistry and Physics, Apr. 27, 2010, pp. 3933-3952, vol. 10, European Geosciences Union, accessed Apr. 23, 2024, https://acp.copernicus.org/articles/10/3933/2010/.
Ponce et al., "Surface Albedo and Water Resources: Hydroclimatological Impact of Human Activities," Journal of Hydrologic Engineering, Oct. 1997, pp. 197-203, vol. 2, Issue 4, ascelibrary.com, accessed Apr. 23, 2024, https://ascelibrary.org/doi/10.1061/%28ASCE%291084-0699%281997%292%3A4%28197%29.
Schumann et al., "In situ observations of particles in jet aircraft exhaustsand contrails for different sulfur-containing fuels," Journal of Geophysical Research: Atmospheres, Mar. 1, 1996, pp. 6853-6869, vol. 101, Issue D3, agupubs.onlinelibrary.wiley.com, accessed Apr. 23, 2024, https://agupubs.onlinelibrary.wiley.com/doi/abs/10.1029/95JD03405.
Schumann, "A contrail cirrus prediction model," Geoscientific Model Development, May 2, 2012, pp. 543-580, European Geosciences Union, accessed Apr. 23, 2024, https://gmd.copernicus.org/articles/5/543/2012/.
Teoh et al., "Aviation contrail climate effects in the North Atlantic from 2016-2021," Atmospheric Chemistry and Physics, Aug. 29, 2022, pp. 1-27, vol. 22, Issue 16, European Geosciences Union, accessed Apr. 23, 2024, https://acp.copernicus.org/articles/22/10919/2022/.

* cited by examiner

GLOBAL COOLING VIA AIRCRAFT

BACKGROUND INFORMATION

1. Technical Field

The present disclosure relates generally to global cooling technologies, and more specifically to the use of commercial aircraft to generate net atmospheric cooling.

2. Background

Since a flying aircraft produces $CO_2$, which contributes to global warming, the airline industry is considered a source of global warming. Since $CO_2$ has a limited lifetime in the atmosphere (on the order of a century), the amount of energy a quantity of $CO_2$ adds to the climate can be considered fixed. A flying aircraft can also contribute to global climate change by producing a trail of ice crystals or by reducing or eliminating clouds. Since ice crystal trails and clouds also have a finite lifetime, the amount of energy they add (or subtract) from the climate can also be considered fixed.

Why $CO_2$ only warms the climate whereas ice crystal trails and clouds can sometimes warm and at other times cool the climate, can be understood by briefly reviewing some aspects of climate physics. Important factors include time of day, lifetime, and local albedo of the Earth's surface below the ice crystal trail or cloud.

When a fixed quantity of $CO_2$ is emitted into the atmosphere, it spreads thinly around the Earth. This thin "blanket" of $CO_2$ "traps" some of the infrared radiation the Earth is emitting into space. This trapped radiation has a warming effect on the Earth's climate, which is commonly known as the "greenhouse effect". Since $CO_2$ spreads evenly around the Earth and exists for decades, time of day and local albedo are irrelevant factors.

When a trail of ice crystals (or cloud) is formed in the atmosphere, it also traps some of the infrared radiation Earth is emitting into space, resulting in warming the climate. But if this ice crystal trail exists during the day, it will also reflect sunlight, resulting in a cooling effect on the climate. The net effect on the climate depends on how strongly and how long the ice crystal trail is trapping radiation compared to how strongly and how long the ice crystal trail is reflecting sunlight. For example, if the ice crystal trail only exists at night, it can only contribute to warming the climate because there is no sunlight to reflect. Whereas, if the ice crystal trail only exists briefly around noontime when the sunlight is most intense, the ice crystal trail might reflect far more sunlight than the radiation its trapping, resulting in a net cooling of the climate. And if an ice crystal trail exists for an entire day and night, the trapped radiation during the day and night might exceed the sunlight only reflected during the day, resulting in the ice crystal trail having an overall contribution to warming the climate.

Another factor to consider when determining whether an ice crystal trail (or cloud) has a warming or cooling effect on the climate, is the albedo of Earth's surface on which the ice crystal trail casts a shadow (i.e. local albedo). For example, if the ice crystal trail exists above a snow-covered ground (high albedo), the ice crystal trail is reflecting sunlight that would have been reflected in the absence of the ice crystal trail, which could nullify the cooling effect of the ice crystal trail.

The amount of energy an energy source contributes to the global climate, also known as climate forcing, can be quantified using the term "energy forcing" (EF), which can have the units of Joules for an entire flight or the units of Joules per meter of flight distance. A positive EF indicates the addition of energy to the environment (i.e. warming), and a negative EF indicates the removal of energy from the environment (i.e. cooling). Although the EF from an aircraft's $CO_2$ production varies between aircraft, a reasonable estimate for a typical commercial jet is $+0.35\times10^8$ J $m^{-1}$. The EF from an aircraft's ice crystal trail is greater and can vary more widely from about $-4\times10^8$ J $m^{-1}$ to $+24\times10^8$ J $m^{-1}$. Similar to the EF for ice crystal trails, the EF for clouds can be positive or negative and vary widely.

SUMMARY

An illustrative embodiment provides a method of determining an aircraft route to produce climate cooling. The method comprises: receiving input of a flight origin and destination for an aircraft; identifying, according to a prediction model, areas within a defined perimeter around the origin and destination that have a predicted threshold probability to generate ice crystal trails responsive to the aircraft flying through the identified areas; identifying a flight route from the origin to the destination that passes through the identified areas; estimating the times of day ice crystal trails formed in the identified areas produce a cooling effect on the climate; and estimating a flight departure time such that the aircraft passes through the identified areas at the times of day estimated to have a cooling effect on the climate.

Another illustrative embodiment provides a system for determining an aircraft route to produce climate cooling. The system comprises a storage device that stores program instructions and one or more processors operably connected to the storage device and configured to execute the program instructions to cause the system to: receive input of a flight origin and destination for an aircraft; identify, according to a prediction model, areas within a defined perimeter around the origin and destination that have a predicted threshold probability to generate ice crystal trails responsive to the aircraft flying through the identified areas; identify a flight route from the origin to the destination that passes through the identified areas; estimate the times of day ice crystal trails formed in the identified areas produce a cooling effect on the climate; and estimate a flight departure time such that the aircraft passes through the identified areas at the times of day estimated to have a cooling effect on the climate.

Another illustrative embodiment provides a method of determining an aircraft route to produce climate cooling. The method comprising: receiving input of a flight origin and destination for an aircraft; identifying, according to a prediction model, areas within a defined perimeter around the origin and destination that have a predicted threshold probability to maintain clouds or form clouds and to eliminate portions of those clouds responsive to the aircraft flying through the clouds; identifying a flight route from the origin to the destination that passes through the clouds within the defined perimeter; estimating the times of day that elimination of clouds produces a cooling effect on the climate; and estimating a flight departure time such that the aircraft passes through the clouds in the identified areas at the times of day estimated to have a cooling effect on the climate.

Another illustrative embodiment provides a system for determining an aircraft route to produce climate cooling. The system comprises a storage device that stores program instructions and one or more processors operably connected to the storage device and configured to execute the program instructions to cause the system to: receive input of a flight origin and destination for an aircraft; identify, according to a prediction model, areas within a defined perimeter around the origin and destination that have a predicted threshold probability to maintain clouds or form clouds and to eliminate portions of those clouds responsive to the aircraft flying through the clouds; identify a flight route from the origin to the destination that passes through the clouds within the defined perimeter; estimate the times of day that elimination of clouds produces a cooling effect on the climate; and estimate a flight departure time such that the aircraft passes through the clouds in the identified areas at the times of day estimated to have a cooling effect on the climate.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
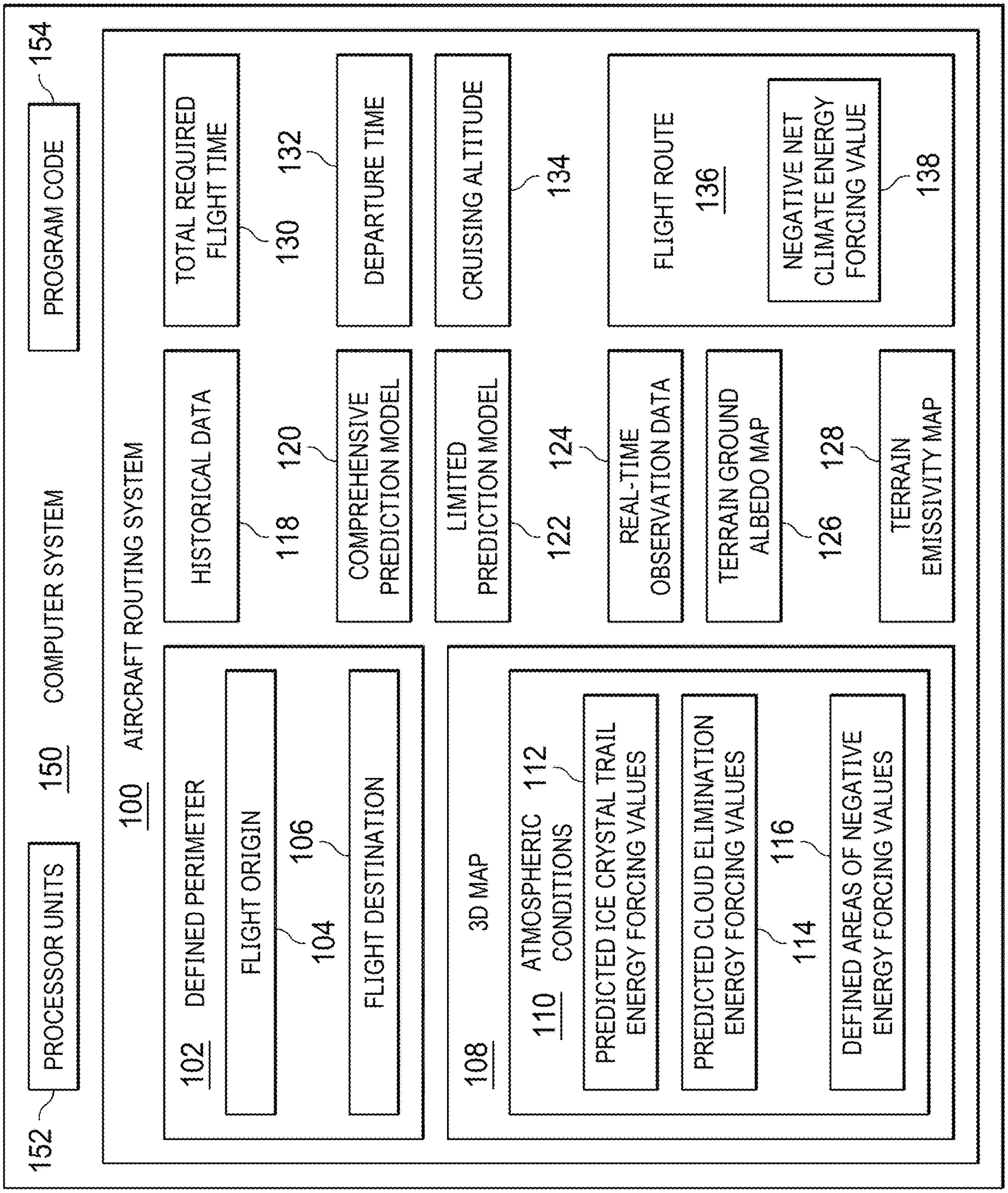
FIG. 1 depicts a block diagram of an aircraft routing system in accordance with an illustrative embodiment.

The illustrative embodiments recognize and take into account that flying aircraft produce $CO_2$, which contributes to global warming. Since $CO_2$ has a limited lifetime in the atmosphere (on the order of a century) the amount of energy a quantity of $CO_2$ adds to the climate can be considered fixed. When a fixed quantity of $CO_2$ is emitted into the atmosphere, it spreads thinly around the Earth, which traps some of the infrared radiation the Earth is emitting into space.

The illustrative embodiments also recognize and take into account that a flying aircraft can also contribute to global climate change by producing a trail of ice crystals (i.e., contrail) or by reducing or eliminating clouds. Since ice crystal trails and clouds also have a finite lifetime, the amount of energy they add (or subtract) from the climate can also be considered fixed.

A trail of ice crystals (or cloud) formed in the atmosphere can also trap some of the infrared radiation Earth is emitting into space, resulting in warming the climate. However, if this ice crystal trail exists during the day, it will also reflect sunlight, resulting in a cooling effect on the climate. The net effect on the climate depends on how strongly and how long the ice crystal trail traps emitted infrared radiation compared to how strongly and how long the ice crystal trail reflects sunlight. For example, if the ice crystal trail only exists at night, it can only contribute to warming the climate because there is no sunlight to reflect. In contrast, if the ice crystal trail exists briefly around noontime when the sunlight is most intense, the ice crystal trail might reflect far more sunlight than the infrared radiation it traps, resulting in a net cooling of the climate. If an ice crystal trail exists for an entire day and night, the trapped infrared radiation during the day and night might exceed the sunlight reflected during the day, resulting in the ice crystal trail having an overall contribution to warming the climate.

Another factor to consider when determining whether an ice crystal trail (or cloud) has a warming or cooling effect on the climate, is the albedo of Earth's surface upon which the ice crystal trail casts a shadow (i.e. local albedo). For example, if the ice crystal trail exists above a snow-covered ground (high albedo), the ice crystal trail will trap sunlight that would have been reflected by the snow in the absence of the ice crystal trail, thereby nullifying the cooling effect of the ice crystal trail.

The amount of energy a source contributes to the global climate, also known as climate forcing, can be quantified using the term "energy forcing" (EF). EF can be expressed as Joules for an entire flight or Joules per meter of flight distance. A positive EF indicates the addition of energy to the environment (i.e. warming) and a negative EF indicates the removal of energy from the environment (i.e. cooling). Although the EF from an aircraft's $CO_2$ production varies between aircraft, a reasonable estimate for a typical commercial jet is $+0.35\times10^8$ J $m^{-1}$. The EF from an aircraft's ice crystal trail is greater and can vary more widely from about $-4\times10^8$ J $m^{-1}$ to $+24\times10^8$ J $m^{-1}$. Similar to the EF for ice crystal trails, the EF for clouds can be positive or negative and vary widely.

The illustrative embodiments provide a method whereby an aircraft flies at select locations, altitudes, and times to produce a trail of ice crystals that contribute to global cooling. Furthermore, an aircraft can contribute to global cooling by reducing or eliminating portions of clouds that contribute to global warming. The illustrative embodiments enable the airline industry to switch from being a contributor to global warming to a contributor to global cooling. In this respect, the illustrative embodiments enable the airline industry to be a global cooling technology on par with carbon capture and sequestration.

Compared to other global cooling technologies, the illustrative embodiments have the advantage of requiring no additional capital costs or additional infrastructure by taking advantage of the existing global air transportation infrastructure of aircraft and airports. The illustrative embodiments do entail operating costs, but these costs are often minimal because the bulk of fuel is used to transport passengers, whereas only a small amount of additional fuel is needed to divert the aircraft such that it contributes to global cooling. For example, under some circumstances, for an aircraft to have a net contribution to global cooling, it will deviate from its planned departure time and flight path in order to "harvest" prime sections of the atmosphere.

FIG. 1 depicts a block diagram of an aircraft routing system in accordance with an illustrative embodiment. Aircraft routing system 100 generates a flight route 136 from a flight origin 104 to a flight destination 106. This flight route 136 is calculated to produce a negative net climate energy forcing value 138 that contributes to climate cooling (explained below).

To determine the flight route 136, aircraft routing system 100 takes into account atmospheric conditions 110 that exist within a defined perimeter 102 around the flight origin 104 and flight destination 106. Information related to these atmospheric conditions 110 are represented in a three-dimensional (3D) map 108. 3D map 108 includes predicted energy forcing values for ice crystals 112 and predicted energy forcing values for cloud elimination 114 that might result from a flying aircraft. 3D map 108 may also display predicted energy forcing values as a function of time. From these predicted energy forcing values, the aircraft routing system 100 can identify defined areas 116 with predicted negative energy forcing values within the defined perimeter 102.

The identification of these defined areas 116 with predicted negative energy forcing values can be performed using historical data 118 regarding geographic location, atmospheric conditions, aircraft type, flight date and time of day. The historical data 118 can be used in conjunction with a limited prediction model 122 or real-time observation data 124. The defined areas 116 can also be identified by a comprehensive prediction model 120.

Aircraft routing system 100 calculates a total required flight time 130 to travel from the flight origin 104 to the flight destination 106 while passing through a number of the defined areas 116 with negative energy forcing values in order to produce the desired negative net climate energy forcing value 138 of the final flight route 136. Given the total required flight time 130, the aircraft routing system 100 determines a departure time 132 that will enable the aircraft to be in the defined areas at times corresponding to optimization of the desired energy forcing values.

In addition, the aircraft routing system 100 also determines a cruising altitude 134 calculated to optimize the desired energy forcing values.

The flight route 136 is determined by overlaying the defined areas within the defined perimeter over a terrain map of ground albedo (for generating ice crystal trails) or a terrain map of emissivity for the corresponding terrain (for cloud elimination).

Information for the flight route 136 can be communicated to an air carrier for implementation, based on the determined flight time through the defined areas, time of day the aircraft is in the defined areas, and cruising altitude, and the flight route that will produce a negative net climate energy forcing value.

The flight route information communicated to the air carrier might comprise information including one or more of a departure time, a flight time through the defined areas, time of day the aircraft is in the defined areas, and cruising altitude which differ from the air carrier's planned departure time, planned cruising altitude, and planned flight route relative to the defined areas when implementing the determined flight route 136.

Aircraft routing system 100 can be implemented in software, hardware, firmware, or a combination thereof. When software is used, the operations performed by aircraft routing system 100 can be implemented in program code configured to run on hardware, such as a processor unit. When firmware is used, the operations performed by aircraft routing system 100 can be implemented in program code and data and stored in persistent memory to run on a processor unit. When hardware is employed, the hardware can include circuits that operate to perform the operations in aircraft routing system 100.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 150 is a physical hardware system and includes one or more data processing systems. When more than one data processing system is present in computer system 150, those data processing systems are in communication with each other using a communications medium. The communications medium can be a network. The data processing systems can be selected from at least one of a computer, a server computer, a mobile device such as a tablet computer, or some other suitable data processing system.

As depicted, computer system 150 includes a number of processor units 152 that are capable of executing program code 154 implementing processes in the illustrative examples. As used herein, a processor unit in the number of processor units 152 is a hardware device and is comprised of hardware circuits such as those on an integrated circuit that respond and process instructions and program code that operate a computer. When a number of processor units 152 execute program code 154 for a process, the number of processor units 152 is one or more processor units that can be on the same computer or on different computers. In other words, the process can be distributed between processor units on the same or different computers in a computer system. Further, the number of processor units 152 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

For a given aircraft flight, the total energy forcing ($EF_{total}$) on the climate resulting from aircraft $CO_2$ emissions, ice crystal trail production, and cloud elimination is approximated by Eq 1:

$$EF_{total} = (1-P)\times D\times EF_{CO_2} + \sum[L\times(EF_{trail} - EF_{cloud})] \quad \text{Eq. 1}$$

where $P$ is the fraction of sustainable aviation fuel in the aircraft, $EF_{CO2}$ is the energy forcing on the climate as a result of $CO_2$ emissions, $EF_{trail}$ is the energy forcing on the climate as a result of ice crystal trail production, and $EF_{cloud}$ is the energy forcing on the climate as a result of a cloud before its eliminated. $EF_{total}$ is expressed Joules. $EF_{CO2}$, $EF_{trail}$, and $EF_{cloud}$ are expressed in Joules per meter. The variable D is the total flight distance, L is the length of the ice crystal trail or length of the section of cloud eliminated, both expressed in meters. The summation sign indicates that the energy forcing that occurs for every segment of a flight is summed accordingly.

Eq. 1 can be used to select flight routes that minimize or mitigate an aircraft's energy forcing on the climate. As a result, Eq. 1 can replace an existing or planned aircraft route that has a high positive energy forcing on the climate (i.e. a heavily warming flight route) with a new aircraft route that has a lower but still positive energy forcing on the climate (i.e. a mildly warming flight route).

The illustrative embodiments use Eq. 1 to seek out flight routes that result in negative energy forcing on the climate, thereby actually cooling the climate, rather than simply reduce the amount of environmental warming. As a result, the more time an aircraft can fly a route having negative energy forcing on the climate, the greater the amount of net cooling the aircraft will contribute to the climate. The more aircraft an airline can fly in routes having a negative energy forcing on the climate, the greater the amount of cooling the airline will contribute to the climate.

Figure 2:
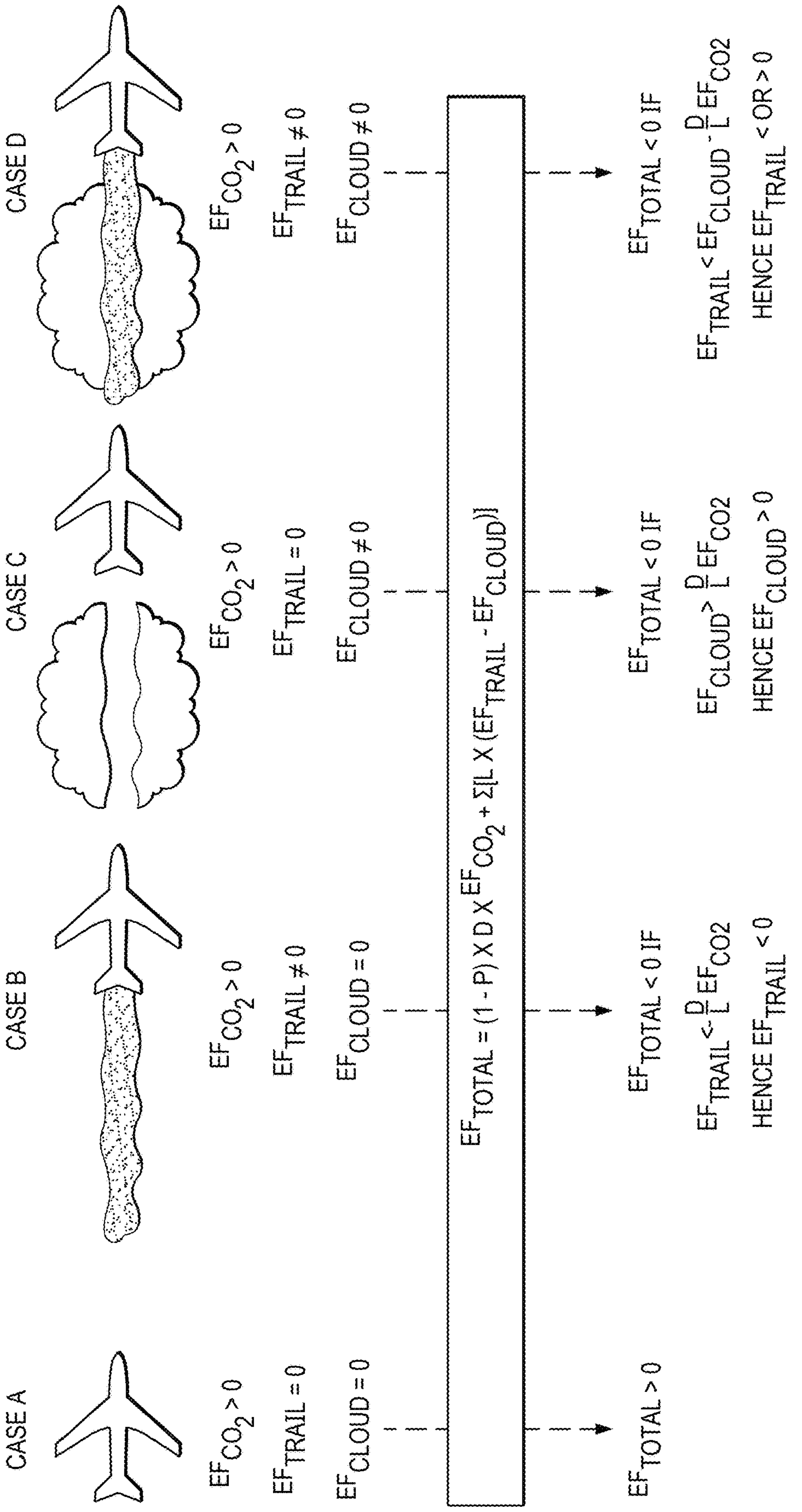
FIG. 2 depicts a number of scenarios of environmental energy forcing to which the illustrative embodiments can be applied.

FIG. 2 depicts a number of scenarios of environmental energy forcing to which the illustrative embodiments can be applied. In all cases, $EF_{CO2}$ is $0.35\times10^8$ J m$^{-1}$, which is a reasonable estimate for the typical commercial jet. Values for $EF_{trail}$ and $EF_{cloud}$ are estimated to range between −4 and $+24\times10^8$ J m$^{-1}$. In addition, to simplify the calculations for ease of explanation, energy forcing for only a single segment of flight is considered, avoiding the need for the summation sign in Eq. 1.

Case A is a scenario in which there is only $CO_2$ production. In this case, no ice crystal trail is produced and no clouds are eliminated. Therefore, $EF_{trail}=EF_{cloud}=0$. In this case, Eq. 1 always yields $EF_{total}>0$, meaning the aircraft cannot cool, but rather warms the climate. Given $EF_{CO2}$ is about $0.35\times10^8$ J m$^{-1}$, a 1000 km route would yield $EF_{total}=3.5\times10^{13}$ Joules.

In Case B an ice crystal trail is produced by the aircraft, but no clouds are eliminated. Therefore, $EF_{trail}\neq EF_{cloud}=0$. Hence, Eq. 1 yields:

$$EF_{total} < 0$$
$$\text{if } EF_{trail} < -(D/L)EF_{CO2}$$

Since D/L is typically >>1, $EF_{trail} << -EF_{CO2}$, meaning the aircraft can cool the climate if the ice crystal trail it produces has a strong cooling effect on the climate.

Alternatively, if $EF_{trail}$ is not much less than $-EF_{CO2}$, the aircraft must be able to produce a much longer ice crystal trail (i.e. reduce the ratio D/L). Given that $EF_{CO2}$ is about $0.35\times10^8$ J m$^{-1}$, and a 1000 km route, where 20% of the route produces the ice crystal trail, one calculates:

$$EF_{trail} < -(D/L)EF_{CO2} = -(1000/200)(0.35\times10^8 \text{ J m}^{-1}) = -1.75\times10^8 \text{ J m}^{-1}$$

which is a value that falls well within the negative range estimated for energy forcing by ice crystal trails (i.e. −4 and $+24\times10^8$ J m$^{-1}$). In other words, this calculation proves that an aircraft can form an ice crystal trail that can completely cancel the aircraft's contributions to global warming caused by the aircraft's carbon dioxide emissions.

By selecting a value for $EF_{trail}$ that is less than $-1.75\times10^8$ J m$^{-1}$, say for example $-2\times10^8$ J m$^{-1}$, the aircraft will cool the climate. It is technically feasible for an aircraft to produce an ice crystal trail having an energy forcing that is negative and great enough such that the aircraft is switched from a contributor to global warming, to a contributor to global cooling.

Case C is a scenario in which an ice crystal trail is not produced, but clouds are eliminated. Therefore, $EF_{cloud}$ $\#EF_{trail}=0$. Hence, Eq. 1 yields:

$$EF_{total} < 0$$
$$\text{if } EF_{cloud} > +(D/L)EF_{CO2}$$

Since D/L is typically >>1, the condition $EF_{cloud} >> EF_{CO2}$ means the aircraft can cool the climate if the cloud it eliminates has a strong warming effect on the climate. Alternatively, if $EF_{cloud}$ is not much greater than $EF_{CO2}$, the aircraft has to eliminate a much longer portion of the cloud (i.e. reduce the ratio D/L).

Given $EF_{CO2}$ is about $0.35\times10^8$ J m$^{-1}$, and a 500 km route where 15% of the route eliminates a portion of a cloud, one calculates:

$$EF_{cloud} > +(D/L)EF_{CO2} = (500/75)(0.35\times10^8 \text{ J m}^{-1}) = +2.33\times10^8 \text{ J m}^{-1}$$

which is a value that falls well within the positive range estimated for energy forcing by clouds. In other words, this calculation proves that an aircraft can eliminate clouds, which can completely cancel the aircraft's contributions to global warming caused by the aircraft's carbon dioxide emissions.

Selecting a value for $EF_{cloud}$ that is greater than $+2.33\times10^8$ J m$^{-1}$, say for example $3\times10^8$ J m$^{-1}$, the aircraft will cool the climate. In other words, it is technically feasible for an aircraft to eliminate clouds having an energy forcing that is positive and great enough such that the aircraft is switched from a contributor to global warming, to a contributor to global cooling.

Case D combines an ice crystal trail and cloud elimination. In this case, both an ice crystal trail is produced and clouds are eliminated. Therefore, $EF_{cloud}\neq0$ and $EF_{trail}\neq0$. Hence, Eq. 1 yields:

$$EF_{total} < 0 \text{ if } EF_{trail} < EF_{cloud} - (D/L)EF_{CO2}$$

If $EF_{cloud} < -(D/L)\, EF_{CO2}$, then $EF_{trail}$ must be negative, meaning the aircraft can only cool the climate if the ice crystal trail has a cooling effect on the climate. However, if $EF_{cloud} > -(D/L)EF_{CO2}$, then $EF_{trail}$ can be negative or positive, meaning the aircraft can cool the climate even if the ice crystal trail has a warming effect on the climate. Therefore, though the aircraft emits carbon dioxide and an ice crystal trail, both of which contribute to warming the climate in this example (i.e. both have positive energy forcing), the aircraft can still contribute to cooling the climate due to the cloud elimination.

When the aircraft is not flying, a strongly warming cloud can contribute to warming the climate. With the aircraft flying through the cloud, a portion of this cloud can be eliminated and replaced with an ice crystal trail that contributes significantly less to warming than the cloud did before the aircraft flew through it. In this scenario, the reduction in climate warming caused by the elimination of a section of the cloud exceeds the sum of the contributions to warming resulting from the aircraft's ice crystal trail and carbon dioxide production. In other words, a strongly warming source is replaced by a mildly warming source.

Given $EF_{CO2}$ is about $0.35\times10^8$ J m$^{-1}$, and an 800 km route where 25% of the route eliminates a portion of a cloud and replaces it with an ice crystal trail, and assuming $EF_{cloud}=5\times10^8$ J m$^{-1}$, one calculates:

$$EF_{trail} < EF_{cloud} - (D/L)EF_{CO2} = 5\times10^8 \text{ J m}^{-1} - (800/200)(0.35\times10^8 \text{ J m}^{-1}) = 5\times10^8 \text{ J m}^{-1} - 1.4\times10^8 \text{ J m}^{-1} = 3.6\times10^8 \text{ J m}^{-1}$$

In this example, if $EF_{trail} < 3.6\times10^8$ J m$^{-1}$, the aircraft will contribute to cooling the climate. In other words, it is technically feasible for an aircraft that emits carbon dioxide and an ice crystal trail, both of which contribute to warming the climate in this example, to eliminate a cloud such that the aircraft switches from a net contributor to global warming, to a net contributor to global cooling.

When considering the impact of an aircraft on the climate per unit of distance flown, an aircraft might be able to produce an ice crystal trail that cools the climate more than the aircraft's carbon dioxide emissions warm the climate. However, if the length of the ice crystal trail is too short, its cooling effect will be insufficient to cancel out the warming effect of the carbon dioxide that is emitted over the entire length of the flight.

For example, in Case B above, $EF_{total}$=0 if $EF_{trail}$=−(D/L) $EF_{CO2}$. Therefore, if D/L=1, then $EF_{trail}$ only has to equal $-EF_{CO2}$, which can be considered an easy feat. If D/L=100, then $EF_{trail}$ has to equal $-100EF_{CO2}$, which can be considered difficult.

Likewise, in Case C, $EF_{total}$=0 if $EF_{cloud}$>+(D/L) $EF_{CO2}$. Therefore, if D/L=1, then $EF_{cloud}$ only has to equal $+EF_{CO2}$, which again can be considered an easy feat. If D/L=100, then $EF_{cloud}$ has to equal $100EF_{CO2}$, which again can be considered difficult.

Figure 3A:
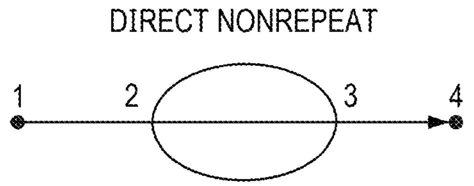
FIG. 3A depicts a direct nonrepeat flight path for producing net climate cooling in accordance with an illustrative embodiment.
Figure 3B:
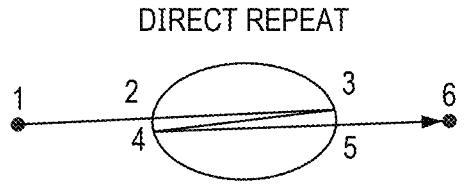
FIG. 3B depicts a direct repeat flight path for producing net climate cooling in accordance with an illustrative embodiment.
Figure 3C:
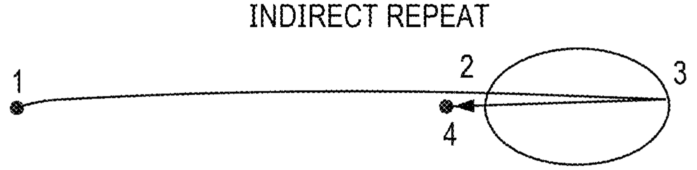
FIG. 3C depicts an indirect repeat flight path for producing net climate cooling in accordance with an illustrative embodiment.

FIGS. 3A-3C depict examples of alternate flight paths for producing net climate cooling in accordance with an illustrative embodiment. In order to alleviate some of the need for finding large regions of the atmosphere having favorable conditions for producing ice crystal trails and eliminating clouds, the aircraft can seek out smaller regions having these atmospheric conditions, then repeatedly fly through them to reduce the ratio D/L to an acceptable level.

Some potential flight route options are shown in FIGS. 3A-3C. The two dots in each example represent the departing and arrival airports. In all the examples shown, a direct flight between the airports is 900 km and the favorable atmospheric region is shown by the grey ellipse and is 300 km wide.

Consider Case B in FIG. 2, where $EF_{total}$=0 if $EF_{trail}$=−(D/L) $EF_{CO2}$. For a direct nonrepeat flight as shown in FIG. 3A, D=900 km (1→2→3→4), and L=300 km (2→3). Therefore:

$$EF_{trail} = -(D/L)EF_{CO2} = -(900/300)EF_{CO2} = -3EF_{CO2}$$

For a direct repeat flight as shown in FIG. 3B, D=1500 km (1→2→3→4→5→6), and L=900 km (2→3→4→5). Therefore:

$$EF_{trail} = -(D/L)EF_{CO2} = -(1500/900)EF_{CO2} = -1.67EF_{CO2}$$

And for an indirect repeat flight as shown in FIG. 3C, D=1500 km (1→2→3→4), and L=600 km (2→3→4). Therefore:

$$EF_{trail} = -(D/L)EF_{CO2} = -(1500/600)EF_{CO2} = -2.5EF_{CO2}$$

These calculations demonstrate for Case B in FIG. 2 that, compared to the direct nonrepeat flight, the direct repeat flight and the indirect repeat flight reduce the required value for $EF_{trail}$ by 44% and 16.6%, respectively.

Now consider Case C in FIG. 2, where $EF_{total}$=0 if $EF_{cloud}$=+(D/L) $EF_{CO2}$. For a direct nonrepeat flight as in FIG. 3A, D=900 km (1→2→3→4), and L=300 km (2→3). Therefore:

$$EF_{cloud} = -(D/L)EF_{CO2} = -(900/300)EF_{CO2} = -3EF_{CO2}$$

For a direct repeat flight as in FIG. 3B, D=1500 km (1→2→3→4→5→6), and L=900 km (2→3→4→5). Therefore:

$$EF_{cloud} = -(D/L)EF_{CO2} = -(1500/900)EF_{CO2} = -1.67EF_{CO2}$$

For an indirect repeat flight as in FIG. 3C, D=1500 km (1→2→3→4), and L=600 km (2→3→4). Therefore:

$$EF_{cloud} = -(D/L)EF_{CO2} = -(1500/600)EF_{CO2} = -2.5EF_{CO2}$$

These calculations demonstrate for Case C that compared to the direct nonrepeat flight, the direct repeat flight and the indirect repeat flight reduce the required value for $EF_{cloud}$ by 44% and 16.6%, respectively.

Furthermore, although the flight routes are shown in FIGS. 3A-3C only in two dimensions for ease of illustration (i.e. aircraft movements horizontal to the ground), the same reasoning here applies to flight routes shown in three dimensions (i.e. also including altitude).

The illustrative embodiments provide methods for determining climate cooling routes according to the factors described above.

One method comprises a comprehensive prediction model. This model uses numerical weather forecasting, aircraft aerodynamics, aircraft engine properties, flight time, and ground albedo to generate a three-dimensional map of predicted energy forcing values for ice crystal trails and cloud elimination. The pilot, airline, or analysist can then use these energy forcing maps to determine a flight route and departure time having a cooling effect on the climate. Input data for the comprehensive prediction model might comprise existing ice crystal trail size, shape, thickness, optical properties, and infrared properties, and how all five of these properties change over time. Likewise, for cloud elimination, the data can be existing cloud size, shape, thickness, optical properties, and infrared properties, and existing cloud elimination by aircraft, and how all six of these properties change over time.

To further improve the prediction model, deeplearning algorithms and hardware optimization through neuromorphic computing can be implemented.

Figure 4A:
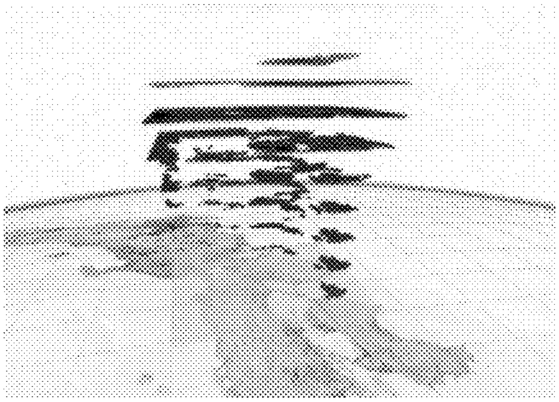
FIG. 4A depicts an example three-dimensional map of energy forcing values for ice crystal trails at night in accordance with an illustrative embodiment.
Figure 4B:
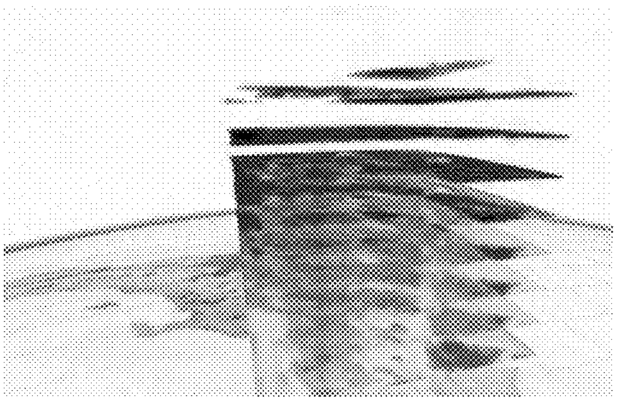
FIG. 4B depicts an example three-dimensional map of energy forcing values for ice crystal trails in the morning in accordance with an illustrative embodiment.
Figure 4C:
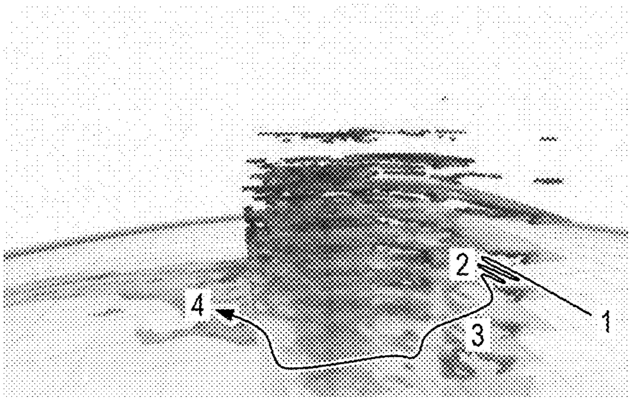
FIG. 4C depicts an example three-dimensional map of energy forcing values for ice crystal trails in the afternoon in accordance with an illustrative embodiment.

FIGS. 4A-4C depict three-dimensional maps of energy forcing values for ice crystal trails in accordance with an illustrative embodiment. Each three-dimensional map of predicted energy forcing values represents a particular time of day in which the ice crystal trails are initially formed.

FIG. 4A represents night when there is no sunlight to reflect (i.e. cooling), but rather only Earth's infrared radiation is trapped (i.e. warming). Therefore, for ice crystal trails at night, all predicted energy forcing values in FIG. 4A are shown in shades indicating all locations of the atmosphere shown can only produce ice crystal trails that warm the climate.

FIG. 4B represents an example of morning when an ice crystal trail both reflects sunlight (cooling) and traps Earth's infrared radiation (warming). Therefore, for ice crystal trails in the morning, the predicted energy forcing values in FIG. 3B are shown in shades indicating some areas of the atmosphere are predicted to produce cooling ice crystal trails, and other areas of the atmosphere are predicted to produce warming ice crystal trails.

FIG. 4C represents an example of the afternoon where again the ice crystal trail both reflects sunlight (cooling) and traps Earth's infrared radiation (warming). However, given the great intensity of the sun's rays in the afternoon, the precited ice crystal trail cooling outweighs the warming. Therefore, for ice crystal trails in the afternoon, the predicted energy forcing values in FIG. 4C are shown mostly in shades indicating most areas of the atmosphere are predicted to produce cooling ice crystal trails.

Figure 5A:
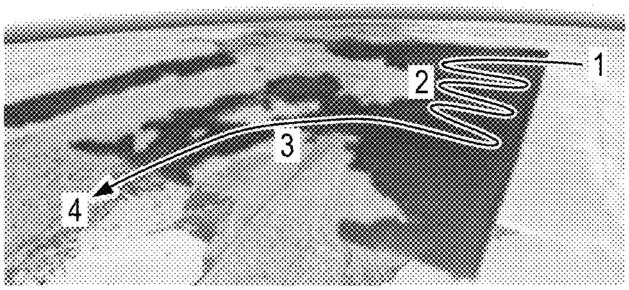
FIG. 5A depicts an example three-dimensional map of energy forcing values for cloud elimination at night in accordance with an illustrative embodiment.
Figure 5B:
FIG. 5B depicts an example three-dimensional map of energy forcing values for cloud elimination in the morning in accordance with an illustrative embodiment.
Figure 5C:
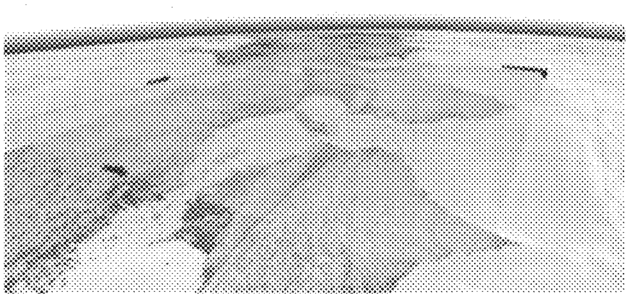
FIG. 5C depicts an example three-dimensional map of energy forcing values for cloud elimination in the afternoon in accordance with an illustrative embodiment

FIGS. 5A-5C depict three-dimensional maps of energy forcing values for cloud elimination in accordance with an illustrative embodiment. Darker shaded areas indicate areas with energy forcing values indicating greater contribution to climate cooling.

FIG. 5A represents an example of night when there is no sunlight to reflect (i.e. cooling), but rather only Earth's infrared radiation to be trapped (i.e. warming). Therefore, for eliminating clouds at night, all predicted energy forcing values in FIG. 5A indicate eliminating any area of the cloud will result in cooling the climate. Note that FIG. 5A represents a cloud layer that only exists at one altitude or limited range of altitudes, and its distribution is patchy.

FIG. 5B represents an example of morning when the cloud layer both reflects sunlight (cooling) and traps Earth's infrared radiation (warming). Therefore, in the morning, the predicted energy forcing values in FIG. 5B indicate eliminating any area of the cloud will result in cooling the climate. However, since the cloud layer does provide some cooling by reflecting sunlight, eliminating areas of the cloud will provide less cooling than if the cloud were eliminated at night. Note that less of the cloud layer exists, which could be a consequence of the morning sunlight "burning off" most of the cloud layer.

FIG. 5C represents the afternoon when the clouds both reflect sunlight (cooling) and trap Earth's infrared radiation (warming). Given the absence of clouds in this example, on the map there are no clouds to eliminate. This absence of clouds could be the consequence of the sunlight "burning off" nearly all of the cloud layer.

A pilot, airline, or analysist can use a time series of energy forcing maps to determine a flight route and departure time having a cooling effect on the climate. For FIG. 4A-4C, route 1→2→3→4, as shown in FIG. 4C (i.e. afternoon flight), might be selected so that the aircraft flight has a net cooling effect on the climate (i.e. $EF_{total}<0$). Note the zigzag portion of the route shown at area "2" represents the route "repeat" or "harvesting" prime sections of the atmosphere intended to reduce $EF_{total}$ as described above.

For FIGS. 5A-5C, route 1→2→3→4, as shown in FIG. 5A (i.e. nighttime flight) might be selected so that the aircraft flight has a net cooling effect on the climate (i.e. $EF_{total}<0$). Note the zigzag portion of the route shown at area "2" represents the route "repeat" or "harvesting" prime sections of the atmosphere intended to reduce $EF_{total}$ as described above. To simultaneously account for both ice crystal trail formation and cloud elimination on a particular flight route, energy forcing values can be selected from the examples shown FIGS. 4A-4A and FIGS. 5A-5C and used to evaluate Equation 1. Although FIGS. 4A-4A and FIGS. 5A-5C show a time sequence of only three maps (i.e. three snapshots in time) spaced several hours apart, a time sequence might have maps spaced by 15 minutes or less, resulting in at least several dozen maps over a 24-hour period from which the pilot, airline, or analysist could use to determine a flight route and departure time having a cooling effect on the climate.

Another illustrative embodiment employs a limited prediction model and historical data. In this approach, a pilot, airline, analysist, or AI system attempts to match a limited or partial prediction model to historical data showing negative energy forcing values (i.e. cooling) for ice crystal trails and/or cloud elimination. The historical data includes, but is not limited to, geographic location, atmospheric conditions, aircraft type, flight date and time of day, and ground albedo along the flight route. The closer the match between the prediction model and the historical data, the greater the probability the aircraft flight will result in cooling the climate. The term "limited' is used to describe this prediction model because it predicts the formation of persistent ice crystal trails but does not predict their energy forcing values. Instead, the ice crystal trail energy forcing values are estimated based on historical data. Input data for the partial prediction model might comprise existing ice crystal trail size, shape, thickness, optical properties, and infrared properties, and how all five of these properties change over time. Likewise, for cloud elimination, the data can be existing cloud size, shape, thickness, optical properties, and infrared properties, and existing cloud elimination by aircraft, and how all six of these properties change over time.

Two general rules of thumb are evident from historical data. The first rule of thumb is persistent ice crystal trails formed around noon tend to produce large negative energy forcing values because the intensity of sunlight peaks around noon, resulting high amounts of sunlight reflected back into space around that time. In other words, an ice crystal trail provides the most shade (i.e. climate cooling) in the middle of the day, but no shade at night.

The second rule of thumb is, for a clear day (i.e. cloudless), the lower the surface albedo along the ice crystal trail, the greater the negative energy forcing value of the ice crystal trail. Without the ice crystal trail, the Earth's surface reflects some sunlight back into space. Therefore, when an ice crystal trail is formed, it replaces the reflecting surface with a reflecting ice crystal trail. The increase in reflected sunlight resulting from the formation of the ice crystal trail is inversely proportional to the amount of sunlight the surface scattered, which varies with the type of surface in question. For example, almost all of the sunlight striking fresh snow is reflected back into space. Therefore, if an ice crystal trail is formed above fresh snow, there will likely be little change in the amount of sunlight reflected into space. In other words, when a good reflector (snow) is swapped for another good reflector (ice crystal trail), the net change in cooling is not significant.

In contrast, seawater reflects very little sunlight. Therefore, if an ice crystal trail is formed above seawater, there will be a large increase in the amount of sunlight reflected into space. In other words, when a poor reflector (seawater) is swapped for good reflector (ice crystal trail), a large increase in cooling will result. Whether the surface is water, sand, snow, vegetation, rock, etc., the fraction of sunlight it reflects is called its albedo.

An example of a limited or partial prediction model is NASA's Rapid Refresh (RAP) model. This model predicts the geographic regions, elevations, and times, having a high probability that an aircraft flight would produce a persistent ice crystal trail. Geographically, RAP covers the US West Coast, East Coast, and the continental United States (CONUS).

FIGS. 6A-6F depict example RAP model forecasts for the US West Coast over the course of a day with which the illustrative embodiments can be implemented. FIGS. 6A-6F comprise a sequence of figures that capture the changing shaded area as a function of time. For this RAP forecast, since UTC is 18:00 and the forecast times are shown as 0, 2, 3, 6, 12, and 18 hours for FIGS. 6A-6F, respectively. The corresponding pacific time zone values are 10:00 AM, 12:00 PM, 1:00 PM, 4:00 PM, 10:00 PM, and 4:00 AM (next day), respectively.

The pilot, airline, analyst, or AI system can match a limited or partial prediction model to historical data showing negative energy forcing values (i.e. cooling) for ice crystal trails. In the present example, the flight departs from San Diego, CA and arrives in Portland, OR. Typically, a commercial jet flying this route would cruise at 30,000 ft with a flight time of about 2 h and 40 min.

The process begins by estimating the flight time using RAP to determine the time of day and altitude that persistent ice crystal trails are likely to form in the geographic region between and around the departing and destination airports as shown in FIGS. 6A-6F. FIGS. 6A-6F show that the aircraft will have to make a 60 to 90-minute detour in order to form ice crystal trails, which are likely to form east of the traditional flight path (see dashed line directly from point between 1 to point 4 in FIGS. 7A-7C). As a result, the new flight time is estimated to be about four hours.

Next, the departure time is estimated using historical data showing high negative energy forcing values (i.e. cooling) for ice crystal trails. From the first rule of thumb, afternoon ice crystal trails have the greatest negative energy forcing values. Because the expected flight time is about four hours, the flight departure time will be 10:00 AM with an approximate arrival time of 2:00 PM. This scheduling puts the middle of the flight at noontime.

Figure 6A:
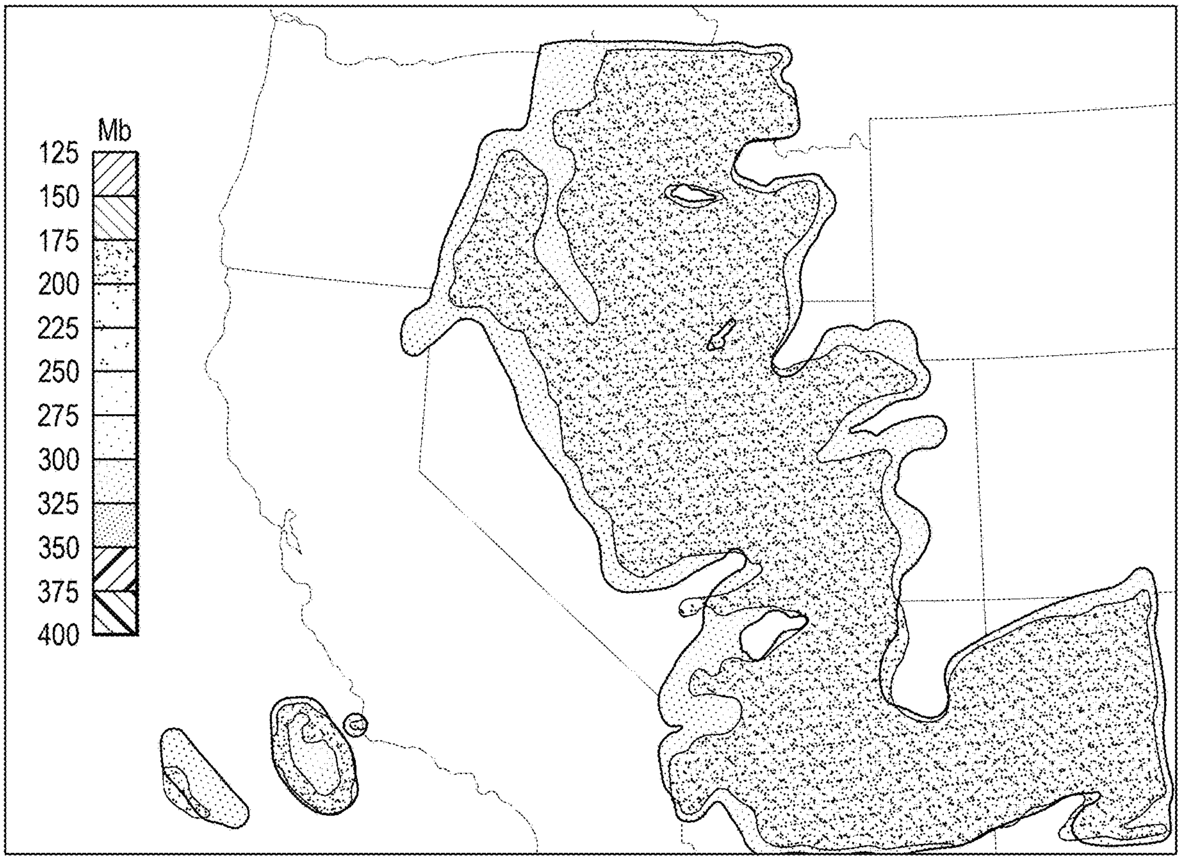
FIG. 6A depicts an example RAP model forecast for the US West Coast at 10:00 AM US Pacific Time with which the illustrative embodiments can be implemented.
Figure 6B:
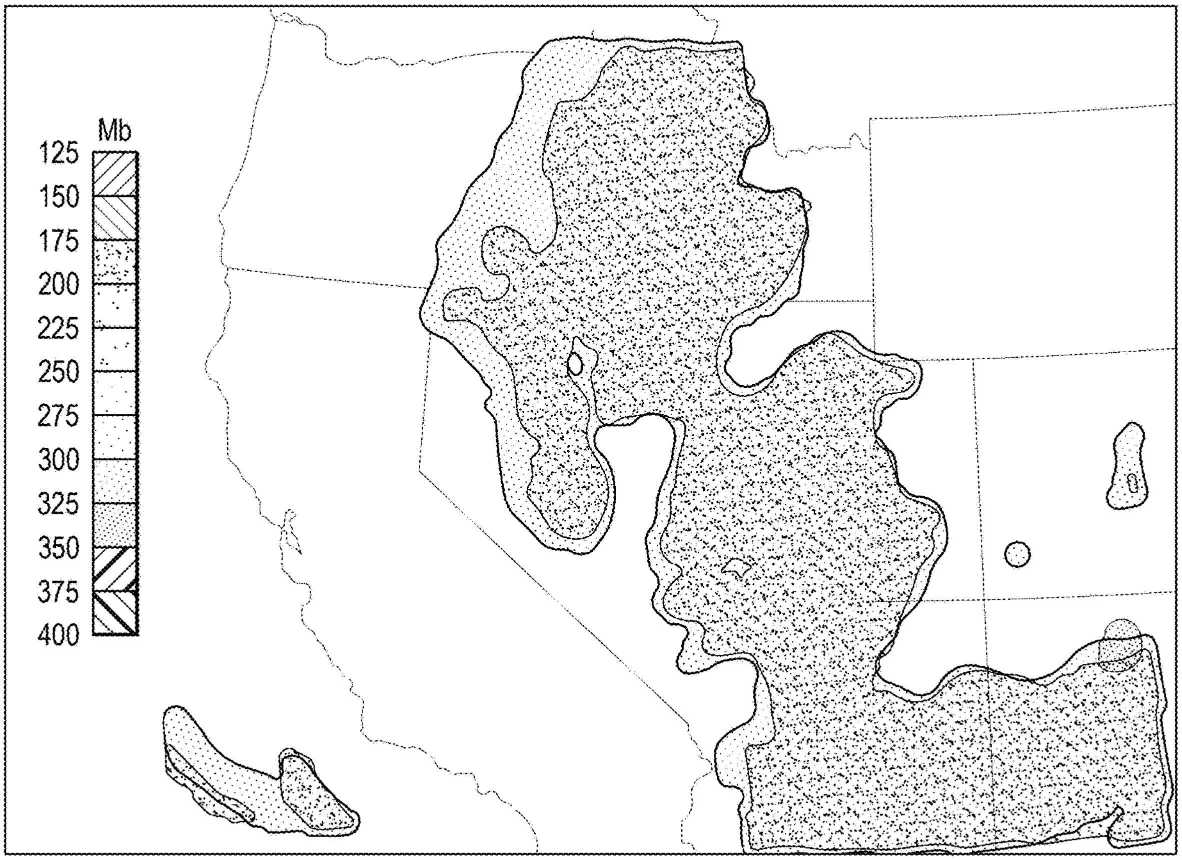
FIG. 6B depicts an example RAP model forecast for the US West Coast at 12:00 PM US Pacific Time with which the illustrative embodiments can be implemented.
Figure 6C:
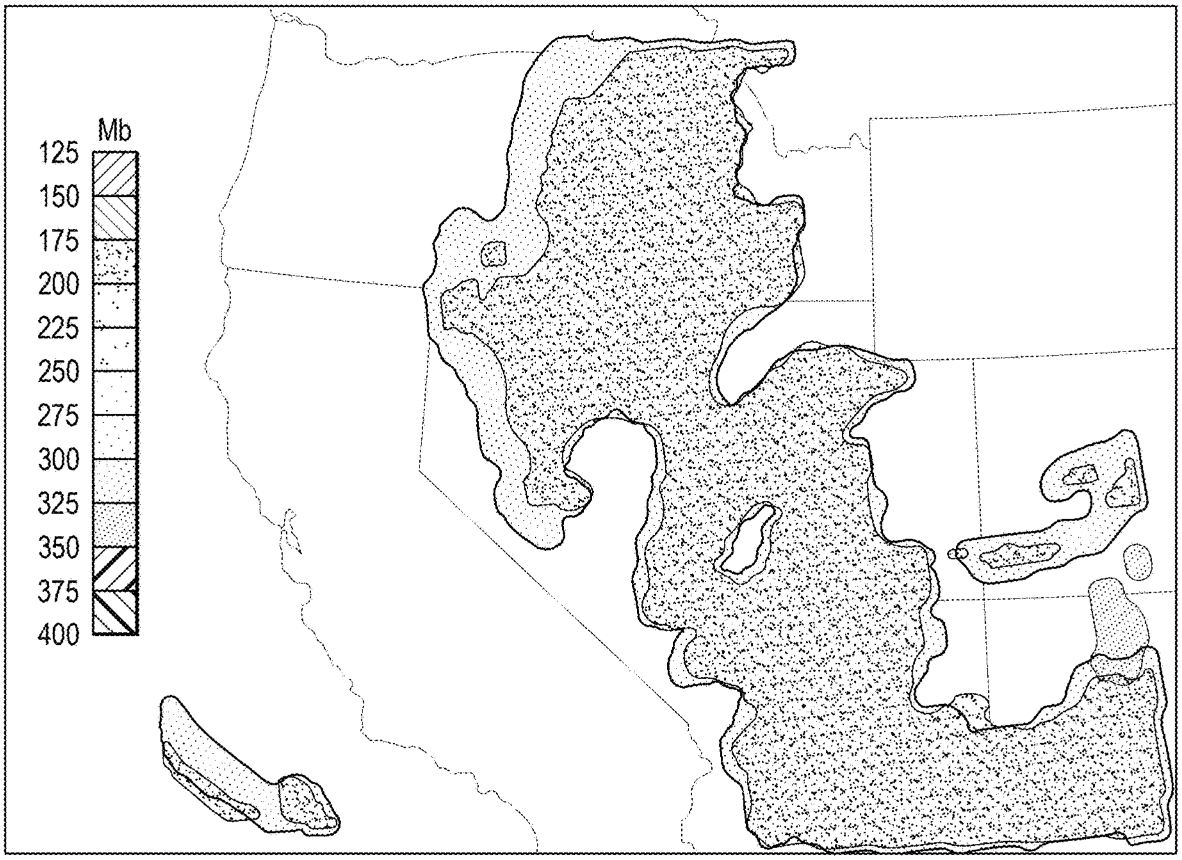
FIG. 6C depicts an example RAP model forecast for the US West Coast at 1:00 PM US Pacific Time with which the illustrative embodiments can be implemented.
Figure 6D:
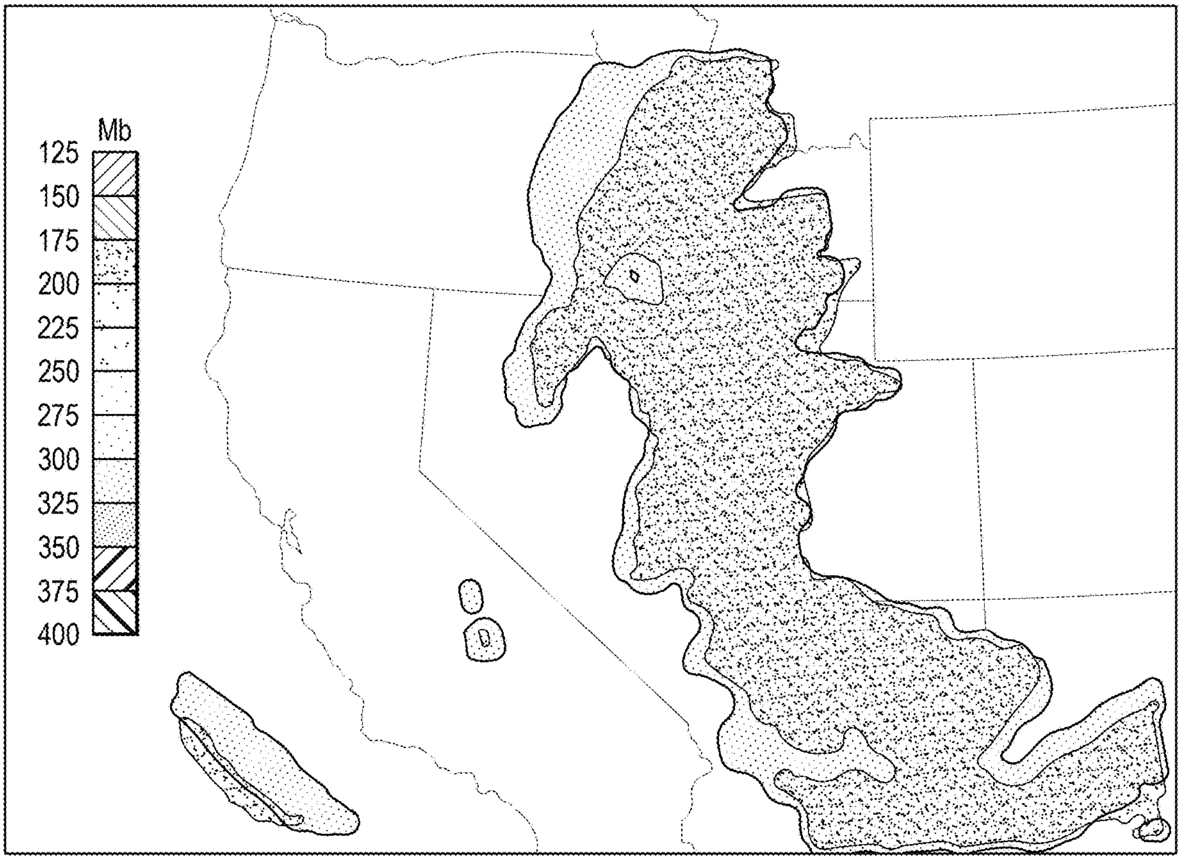
FIG. 6D depicts an example RAP model forecast for the US West Coast at 4:00 PM US Pacific Time with which the illustrative embodiments can be implemented.
Figure 6E:
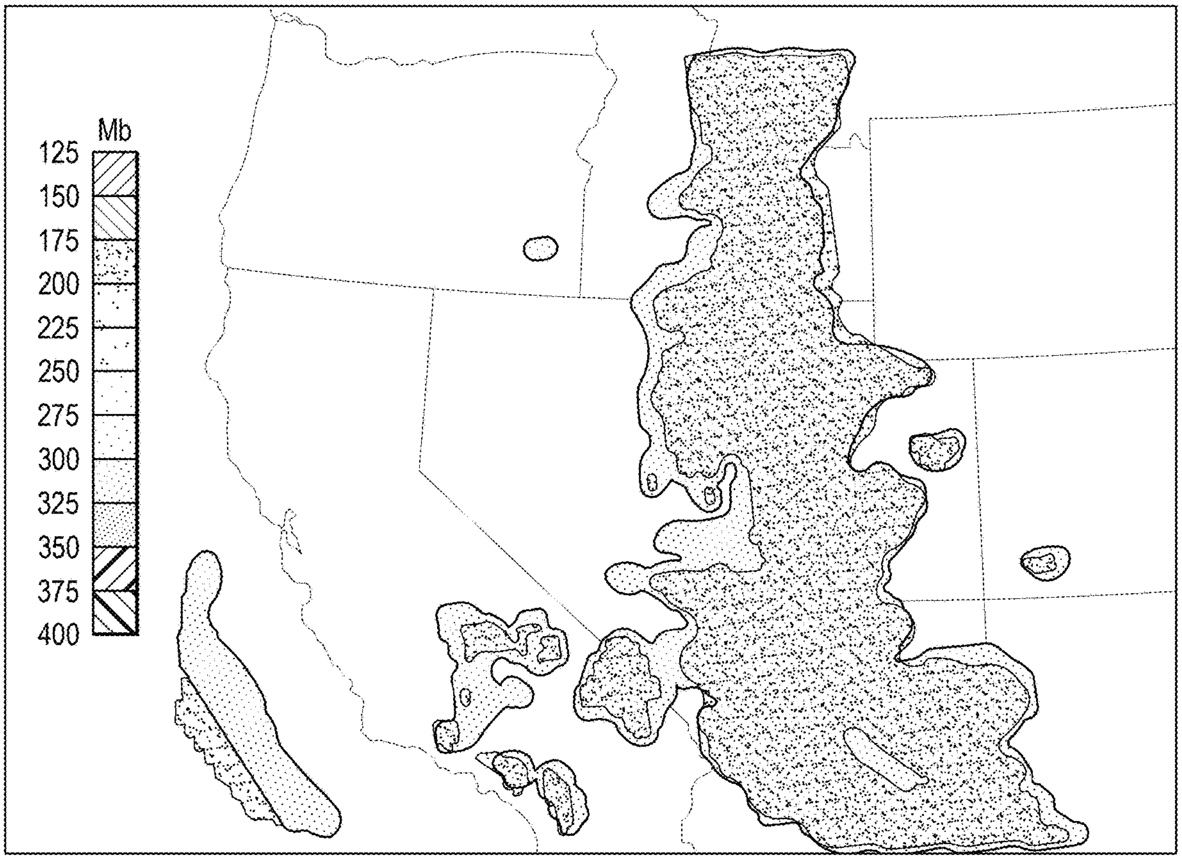
FIG. 6E depicts an example RAP model forecast for the US West Coast at 10:00 PM US Pacific Time with which the illustrative embodiments can be implemented.
Figure 6F:
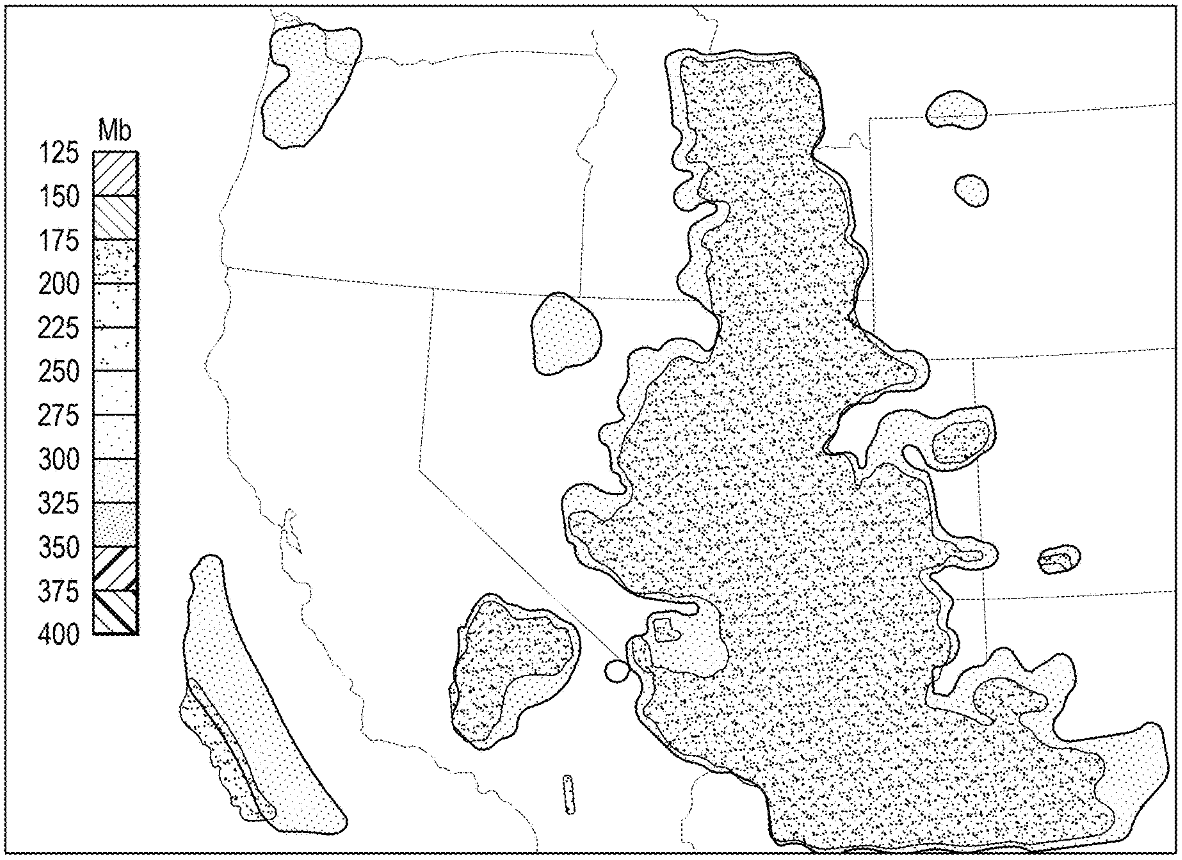
FIG. 6F depicts an example RAP model forecast for the US West Coast at 4:00 AM Pacific Time (next day) with which the illustrative embodiments can be implemented.

Third, the flight cruising altitudes are determined by examining the RAP output for the duration of the flight (i.e. 10:00 AM to 2:00 PM). In this case, only FIGS. 6A-6C correspond to times that fall within this flight schedule. Since FIGS. 6A-6C show there are only two altitudes in which persistent ice crystal trails are likely to form from aircraft (29,000 ft and 40,000 ft), the altitude selected for this flight is 29,000 ft because its coverage is slightly more than the coverage at 40,000 ft. Note, in some cases, one might want to fly at various altitudes along a route to exploit favorable atmospheric conditions for the formation of ice crystal trails.

Finally, the flight route is determined by overlaying the perimeter of the 29,000 ft coverage onto a map of the albedo for the corresponding terrain.

Figure 7A:
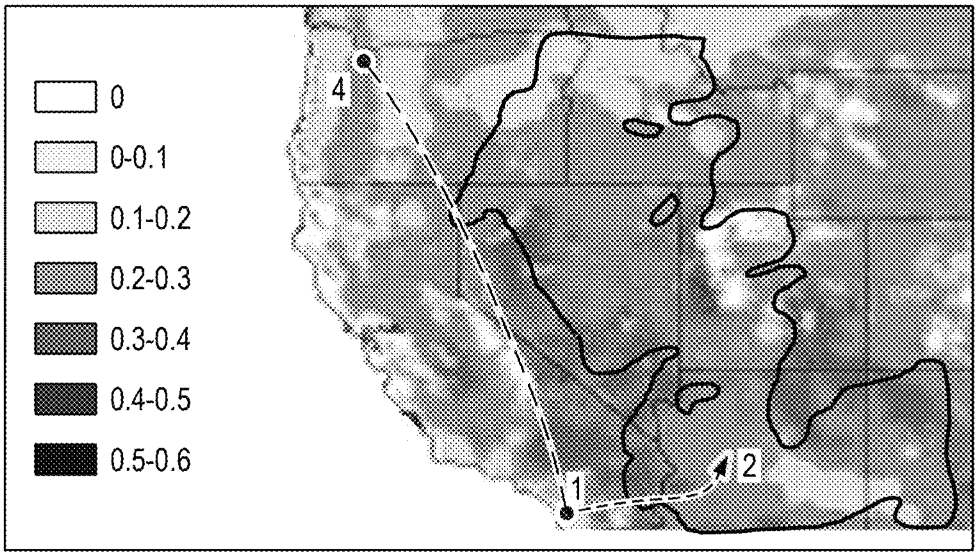
FIG. 7A depicts a first part of a flight route planned to produce an ice crystal trail with high negative energy forcing values in accordance with an illustrative embodiment.
Figure 7B:
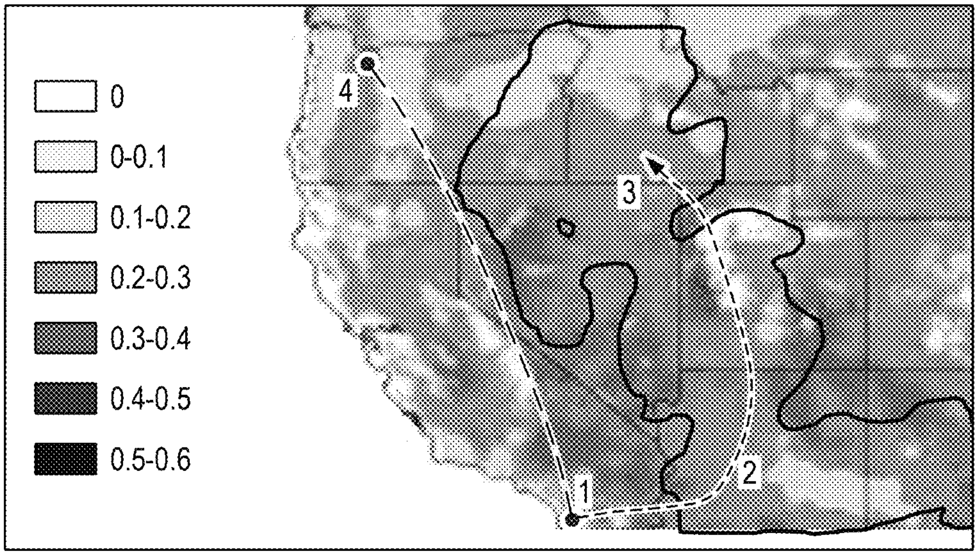
FIG. 7B depicts a second part of the flight route planned to produce an ice crystal trail with high negative energy forcing values in accordance with an illustrative embodiment.
Figure 7C:
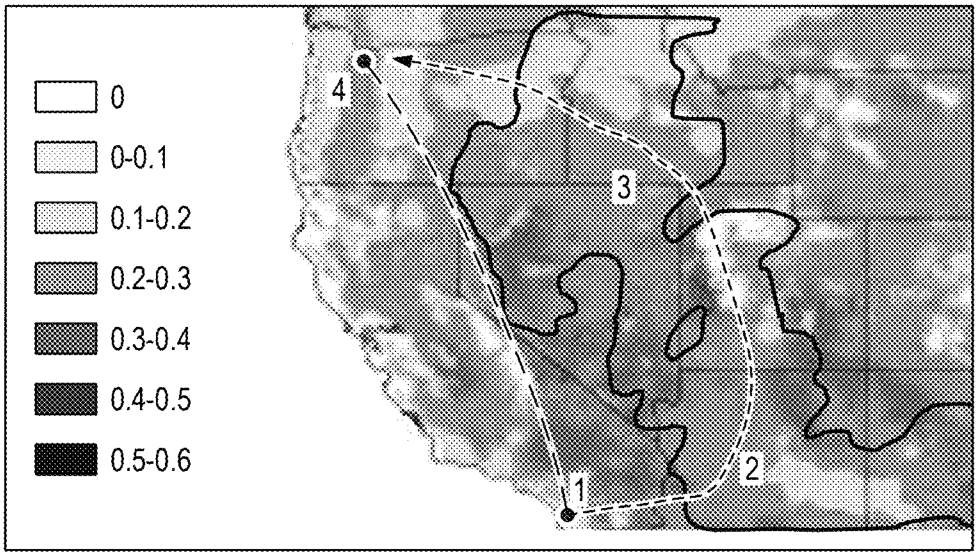
FIG. 7C depicts a final part of the flight route planned to produce an ice crystal trail with high negative energy forcing values in accordance with an illustrative embodiment.

FIGS. 7A-7C depict a flight route planned to produce an ice crystal trail with high negative energy forcing values in accordance with an illustrative embodiment. FIGS. 7A-7C depict the flight route of the example above in relation to FIGS. 6A-6F. The map of the albedo for the corresponding terrain is represented by the solid black line in FIGS. 7A-7C. The selected flight route is represented by the dashed black line, which passes over terrain having the lowest possible albedo.

As shown in FIG. 7A, starting at 10:00 the flight route is selected to go east of San Diego (location 1) to location 2, which is located inside the 29,000 ft coverage for favorable ice crystal trail formation with a reasonable surface albedo of 0.25. At 12:00 PM (shown in FIG. 7B) the flight route is selected to move northward over surfaces with a 0.25 albedo, and a surface having a near zero albedo located just south of location 3 shown by the white elongated patch. FIG. 7C shows the final part of the flight route, which is selected to pass over surfaces having a mostly 0.25 albedo and some surfaces having a 0.15 albedo before arriving in Portland (location 4).

Figure 8A:
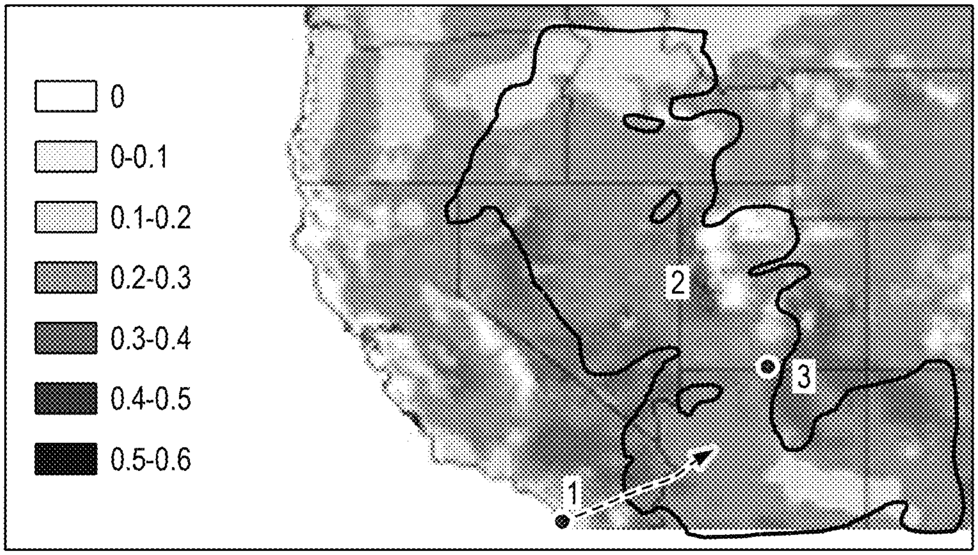
FIG. 8A depicts a first part of another flight route example planned to produce an ice crystal trail with high negative energy forcing values in accordance with an illustrative embodiment.
Figure 8B:
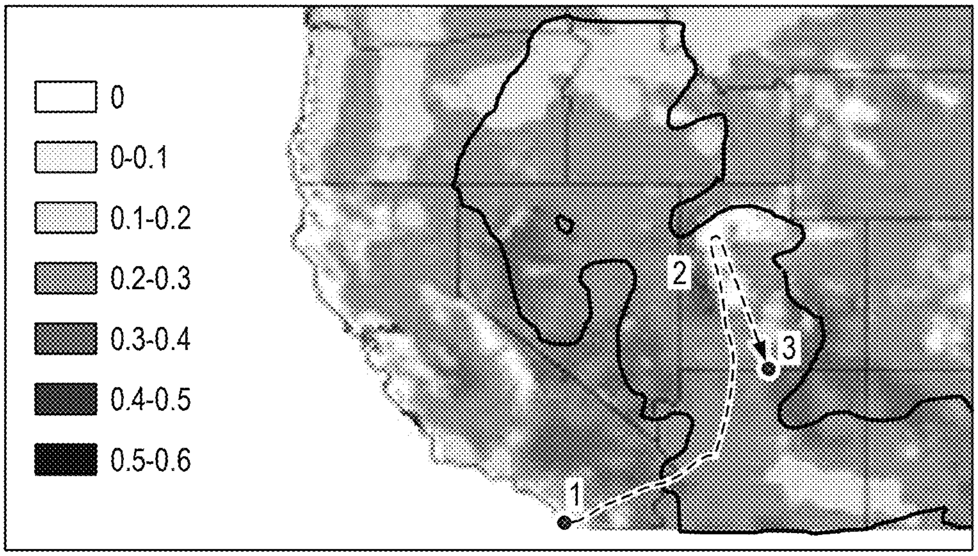
FIG. 8B depicts a final part of the flight route planned to produce an ice crystal trail with high negative energy forcing values in accordance with an illustrative embodiment.

FIGS. 8A and 8B depict another example of a flight route planned to produce an ice crystal trail with high negative energy forcing values in accordance with an illustrative embodiment. FIGS. 8A and 8B also utilize the same data presented in FIGS. 6A-6F. The flight route shown in FIGS. 8A and 8B depicts an example of an indirect repeat flight from FIG. 3C.

In this example, the flight departs from San Diego, CA and arrive in Page, AZ. Typically, a flight on this route would cruise at 30,000 ft with a flight time of about one hour. Using the process described in the previous example, FIGS. 8A and 8B are generated. In this example, the flight time is extended to two hours in order to produce ice crystal trails over the near zero albedo area shown as the white elongated patch (location 2) north of Page, AZ (location 3). As in the previous example, the flight departure time from San Diego is 10:00 AM (FIG. 8A) and with an arrival time at Page of approximately 12:00 PM (FIG. 8B).

Another illustrative embodiment utilizes real-time observations with historical data. In his approach, a pilot, airline, analyst, or AI system attempts to match real-time observations with historical data showing negative energy forcing values (i.e. cooling) for ice crystal trails and/or cloud elimination. The historical data includes, but is not limited to, geographic location, atmospheric conditions, aircraft type, flight date and time of day, and ground albedo along the flight route. The closer the match between the real-time observation and the historical data, the greater the probability the aircraft flight will result in cooling the climate.

Real-time observations are defined as sightings by people or detections by instruments of aircraft producing persistent ice crystal trails or aircraft eliminating or reducing cirrus clouds. Real-time observations are further defined as occurring within 24 hours of the departure time of the aircraft planning to exploit such real-time observations for cooling the climate. Furthermore, real-time observation data can be made abundant by deploying a global real-time observation system resulting in greater "cooling" aircraft flights and more of them. In addition, since aircraft turbulence plays a role in the formation of ice crystal trails, historical data can include aircraft turbulence. Input data based on observations might comprise existing ice crystal trail size, shape, thickness, optical properties, and infrared properties, and how all five of these properties change over time. Likewise, for cloud elimination, the data can be existing cloud size, shape, thickness, optical properties, and infrared properties, and existing cloud elimination by aircraft, and how all six of these properties change over time.

An example of historical data showing large negative energy forcing values for ice crystal trails, along with two rules of thumb, were already described above.

Figure 9A:
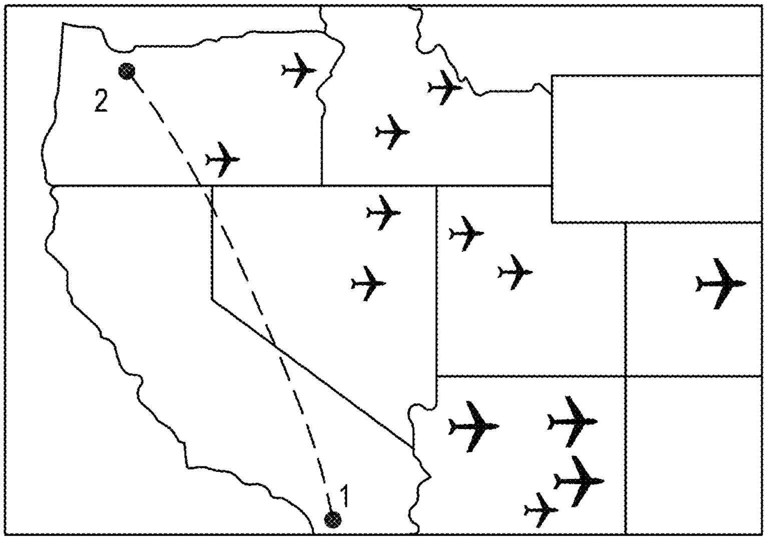
FIG. 9A depicts the compiling of real-time observations from various sources of aircraft forming ice crystal trails in the geographic region between and around the departing and destination airports in accordance with an illustrative embodiment.
Figure 9B:
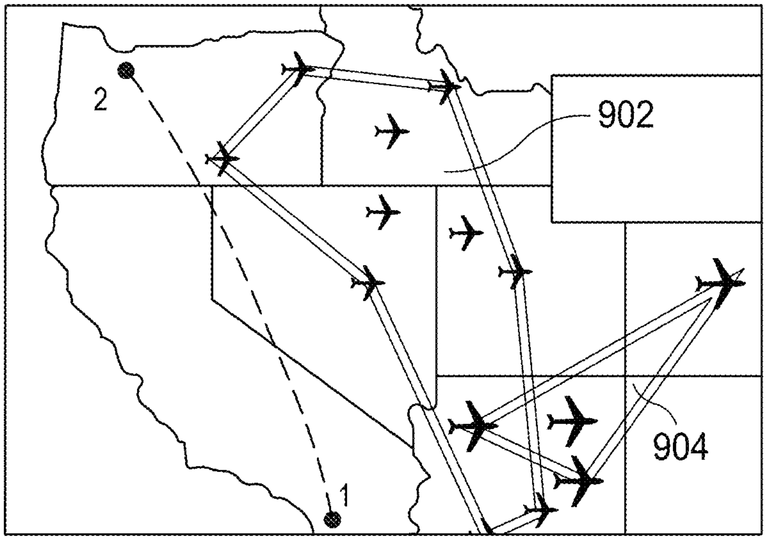
FIG. 9B depicts the determination of atmospheric zones favorable to the formation of ice crystal trails according to observed aircraft in accordance with an illustrative embodiment.
Figure 9C:
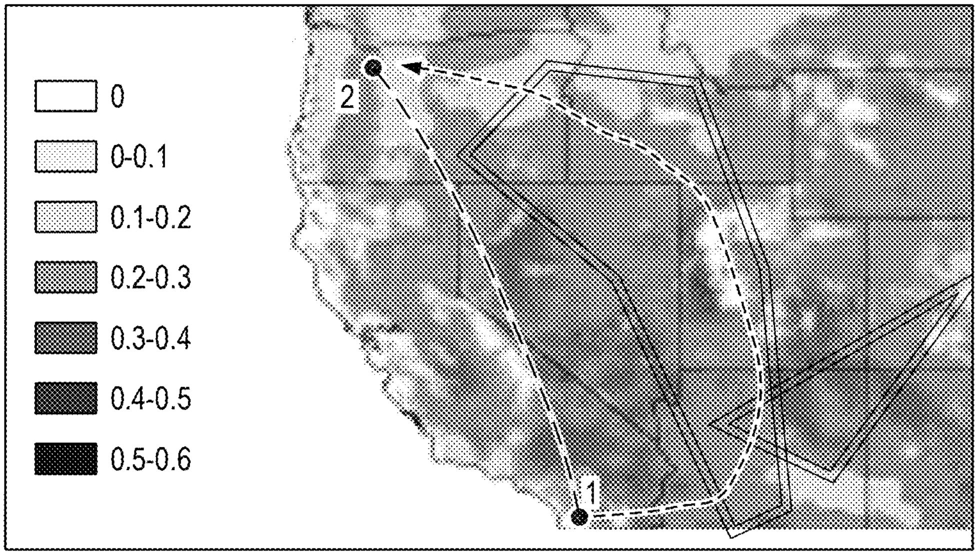
FIG. 9C depicts the flight route determination by overlaying the perimeter of an atmospheric zone onto a map of the albedo for the corresponding terrain in accordance with an illustrative embodiment.

FIGS. 9A-9C depict a flight route planned to produce an ice crystal trail utilizing real-time observations with historical data in accordance with an illustrative embodiment. Similar to the example shown in FIGS. 7A-7C, this example is for a flight from San Diego, CA to Portland, OR and also utilize the historical data presented in FIGS. 6A-6F. Typically, a commercial jet flying this route would cruise at 30,000 ft altitude with a flight time of about 2 h and 40 min.

The process begins by compiling real-time observations from various sources (e.g., people, aircraft, satellites, etc.) of aircraft forming ice crystal trails in the geographic region between and around the departing and destination airports as shown in FIG. 9A. Location 1 is San Diego, location 2 is Portland. The dotted line represents the traditional flight route. The smaller aircraft symbols represent observation locations of aircraft producing ice crystal trails at around 32,000 ft of altitude. The larger aircraft symbols represent observation locations of aircraft producing ice crystal trails at around 43,000 ft.

FIG. 9B shows the determination of atmospheric zones favorable to the formation of ice crystal trails by drawing lines connecting observed aircraft forming ice crystal trails at similar altitudes. For each narrow range of altitudes, the closure of these lines forms an atmospheric zone that, for an aircraft flying through it, is likely to form an ice crystal trail. The 32,000 ft atmospheric zone 902 is represented by the larger area double-lined section, defined by the smaller plane symbols. The 43,000 ft atmospheric zone 904 is represented by the smaller area double-lined section defined by the larger plane symbols.

The flight time is estimated based on the extra time needed to fly the aircraft through one or more of these atmospheric zones. In the present example, FIG. 9B shows the aircraft will have to make a 60 to 90-minute detour in order to fly through an atmospheric zone favorable to forming ice crystal trails. As a result, the new flight time is estimated to be about four hours.

The departure time is estimated using historical data showing high negative energy forcing values (i.e. cooling) for ice crystal trails. Since from the first rule of thumb above, afternoon ice crystal trails have the greatest negative energy forcing values, and the expected flight time is about four hours, the flight departure time is set at 10:00 AM with an approximate arrival time of 2:00 PM, which puts the middle of the flight at noontime.

The flight cruising altitude is determined by examining FIG. 9B to select the atmospheric zone that will likely result in the aircraft forming the longest contrails (ice crystal trails). In the present example, only two atmospheric zones exist for ease of illustration, a larger zone 902 located at 32,000 ft, and the other, a smaller zone 904 located at 43,000 ft. In this case, the atmospheric zone at 32,000 ft is selected because it is the larger zone and is located at a reasonable altitude for a cruising aircraft.

The flight route is then determined by overlaying the perimeter of atmospheric zone 902 onto a map of the albedo for the corresponding terrain as shown FIG. 9C. The flight route is represented by a dashed black line and is selected such that it passes over surfaces having the lowest possible albedo. Note that the flight path is over the large patch of surface having an albedo shown by the white patch.

Based on historical data for cirrus clouds, a third rule of thumb is that cirrus clouds, on average, exert a net heating effect on the Earth. A fourth rule of thumb is that cirrus clouds that only exist at night only heat the climate.

Figure 10A:
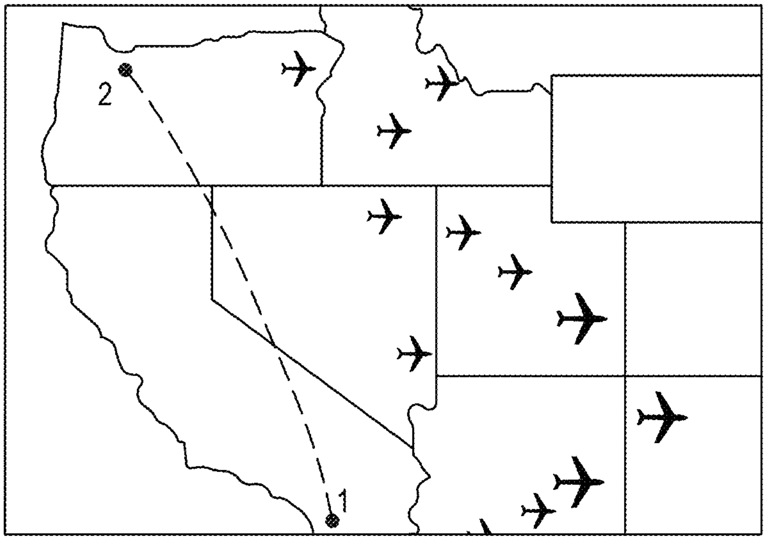
FIG. 10A depicts the compiling of real-time observations to historical data showing negative energy forcing values for cirrus cloud elimination in the geographic region between and around the departing and destination airports in accordance with an illustrative embodiment.
Figure 10B:
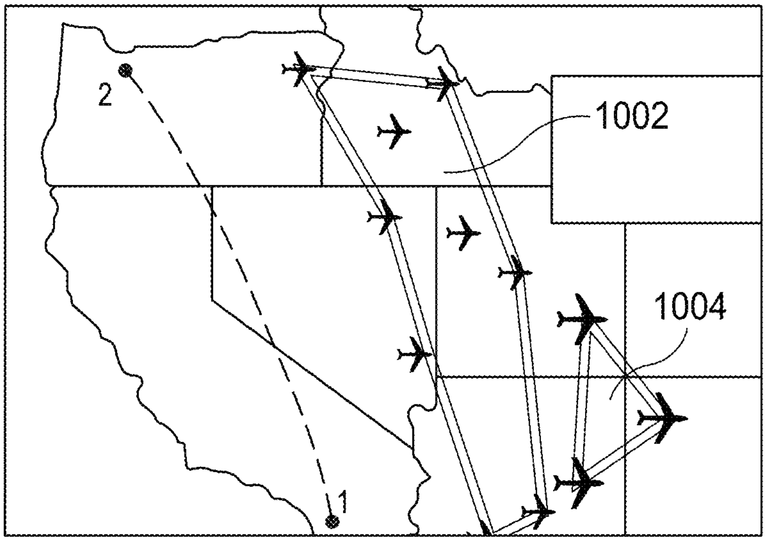
FIG. 10B depicts the determination of atmospheric zones favorable to cirrus cloud elimination according to observed aircraft in accordance with an illustrative embodiment.
Figure 10C:
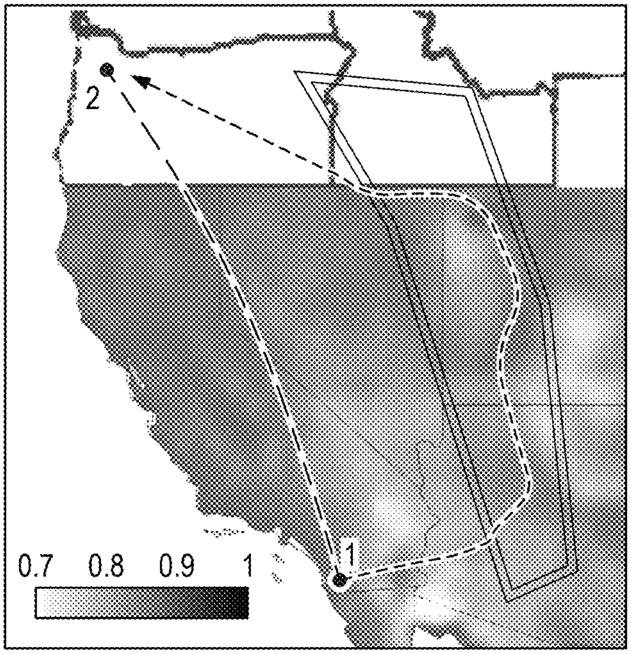
FIG. 10C depicts the flight route determination by overlaying the perimeter of an atmospheric zone onto a map of the emissivity for the corresponding terrain in accordance with an illustrative embodiment.

FIGS. 10A-10C depict an example of matching real-time observations to historical data showing negative energy forcing values (i.e. cooling) for cirrus cloud elimination in accordance with an illustrative embodiment. As with previous example, FIGS. 10A-10C apply to a flight from San Diego, CA, and Portland, OR. As noted above, typically, a commercial jet flying this route would cruise at 30,000 ft with a flight time of about 2 h and 40 min.

The evening of the flight, real-time observations of aircraft eliminating clouds are compiled from various sources (people, aircraft, satellites, etc.) in the geographic region between and around the departing and destination airports as shown in FIG. 10A. As with the example above, location 1 is San Diego, location 2 is Portland, and the dotted line is the traditional flight route. The smaller aircraft symbols represent observation locations of aircraft eliminating clouds at around 35,000 ft, and the larger aircraft symbols represent observation locations of aircraft eliminating clouds at around 45,000 ft.

Atmospheric zones favorable to cloud elimination by aircraft are determined by drawing lines connecting observed aircraft eliminating clouds at similar altitudes as shown in FIG. 10B. For each narrow range of altitudes, the closure of these lines forms an atmospheric zone that, for an aircraft flying through it, is likely to eliminate a cloud. In FIG. 10B, the 35,000 ft altitude atmospheric zone 1002 is represented by the larger area double-lined section defined by the smaller aircraft symbols, and the 45,000 ft atmospheric zone 1004 is represented by the smaller area double-lined section defined by the larger aircraft symbols.

The flight time is estimated based on the extra time needed to fly the aircraft through one or more of these atmospheric zones. In the present example, FIG. 10B shows the aircraft will have to make a 60 to 90-minute detour in order to fly through an atmospheric zone favorable to eliminating clouds, which are shown east of the traditional flight path. As a result, the new flight time is estimated to be about four hours, similar to the above example.

The departure time is then estimated using historical data showing high negative energy forcing values (i.e. cooling) for cloud elimination. From the fourth rule of thumb, cirrus clouds that exist at night only heat the climate. Therefore, because the expected flight time is about four hours, the flight departure time will be around 8:00 PM with an approximate arrival time of midnight. This schedule ensures that the clouds eliminated will exist only at night when they heat the climate, thereby producing a cooling impact on the climate.

The flight cruising altitude is determined by examining FIG. 10B to select the atmospheric zone that will likely result in the aircraft eliminating the longest sections of clouds. In this case, only two atmospheric zones exist, a larger atmospheric zone 1002 located at 35,000 ft, and the other, a small atmospheric zone 1004 located at 45,000 ft. In the present example, atmospheric zone 1002 located 35,000 ft is selected because it is the larger zone and is located at a reasonable altitude for a cruising aircraft.

The flight route is determined by overlaying the perimeter of the 35,000 ft atmospheric zone 1002 onto a map of the emissivity for the corresponding terrain as shown FIG. 10C. The higher the emissivity, the greater the amount of infrared (long-wave) radiation being emitted from the surface and trapped by the clouds, and therefore the greater the amount of infrared radiation released into space if the cloud is eliminated. The flight route represented by the dashed line is selected such that it passes over surfaces having the highest emissivity. Note, the emissivity for sections of the Earth's surface can be obtained from the Joint Emissivity Database Initiative created by JPL/NASA.

The calculations employed by the illustrative embodiments when determining the flight route having the greatest cooling effect on the climate can be further optimized by accounting for wind induced drift of ice crystal trails over the surface of albedo, and wind induced drift of clouds (eliminated, thinned, or reduced) over the surface emissivity. Such drift would require a time averaging of the albedo and emissivity for the ice crystal trail and eliminated, thinned, or reduced cloud, respectively.

Figure 11:
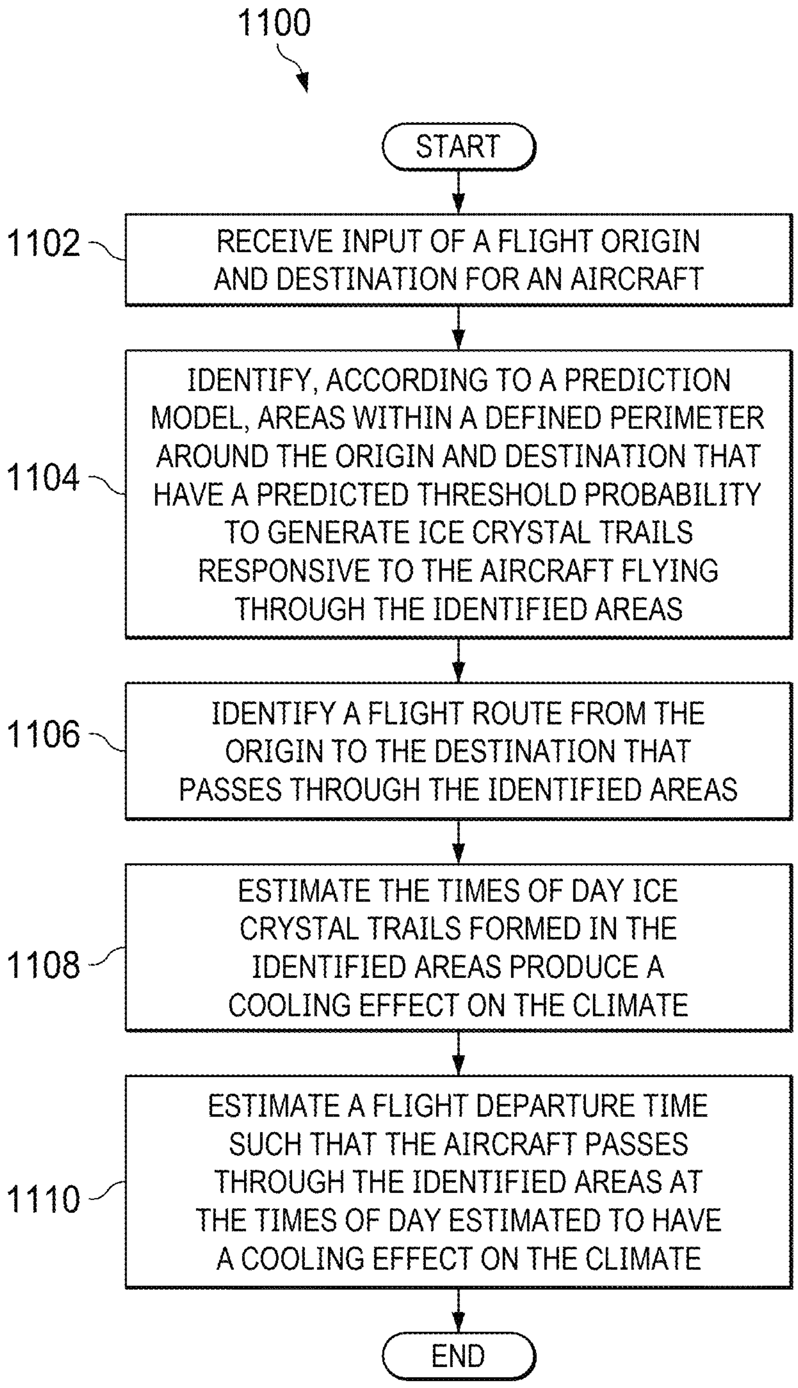
FIG. 11 depicts a flowchart illustrating a process for determining an aircraft route to produce climate cooling in accordance with an illustrative embodiment.

FIG. 11 depicts a flowchart illustrating a process for determining an aircraft route to produce climate cooling in accordance with an illustrative embodiment. Process 1100 can be implemented in aircraft routing system 100.

Process 1100 begins by receiving input of a flight origin and destination (operation 1102). Process 1100 identifies, according to a prediction model, areas within a defined perimeter around the origin and destination that have a predicted threshold probability to generate ice crystal trails responsive to the aircraft flying through the identified areas (operation 1104). The identified areas within the defined perimeter may comprise a three-dimensional map of predicted energy forcing values. The three-dimensional map may display predicted energy forcing values as a function of time. The prediction model may use at least one of weather data, aircraft aerodynamics, aircraft engine properties, flight times, and altitude. The weather data may comprise at least one of air temperature, air humidity, windspeed, air pressure, air density, cloud and fog coverage, cloud and fog infrared and optical properties, aerosol concentrations, or aerosol infrared and optical properties.

A flight route from the origin to the destination is identified that passes through the identified areas (operation 1106).

Process 1100 estimates the times of day ice crystal trails formed in the identified areas produce a cooling effect on the climate (operation 1108) and then estimates a flight departure time such that the aircraft passes through the identified areas at the times of day estimated to have a cooling effect on the climate (operation 1110). Estimating the times of day ice crystal trails formed in the identified areas produce a cooling effect on the climate may be based on at least one of terrestrial data or space data. Terrestrial data may comprise at least one of surface emissivity or surface albedo. Space data may comprise at least one of solar irradiance, sunspots, solar flares, moon orbit location, or solar eclipse.

Information for the identified flight route can be communicated to an air carrier for implementation, based on the determined flight time through the identified areas, time of day the aircraft is in the identified areas, and cruising altitude, and the flight route that will produce a negative net climate energy forcing value. The flight route information communicated to the air carrier might further comprise information including one or more of a departure time, flight time through the defined areas, time of day the aircraft is in the identified areas, and cruising altitude which differ from the air carrier's planned departure time, planned cruising altitude, and planned flight route relative to the identified areas when implementing the identified flight route.

Process 1100 then ends.

Figure 12:
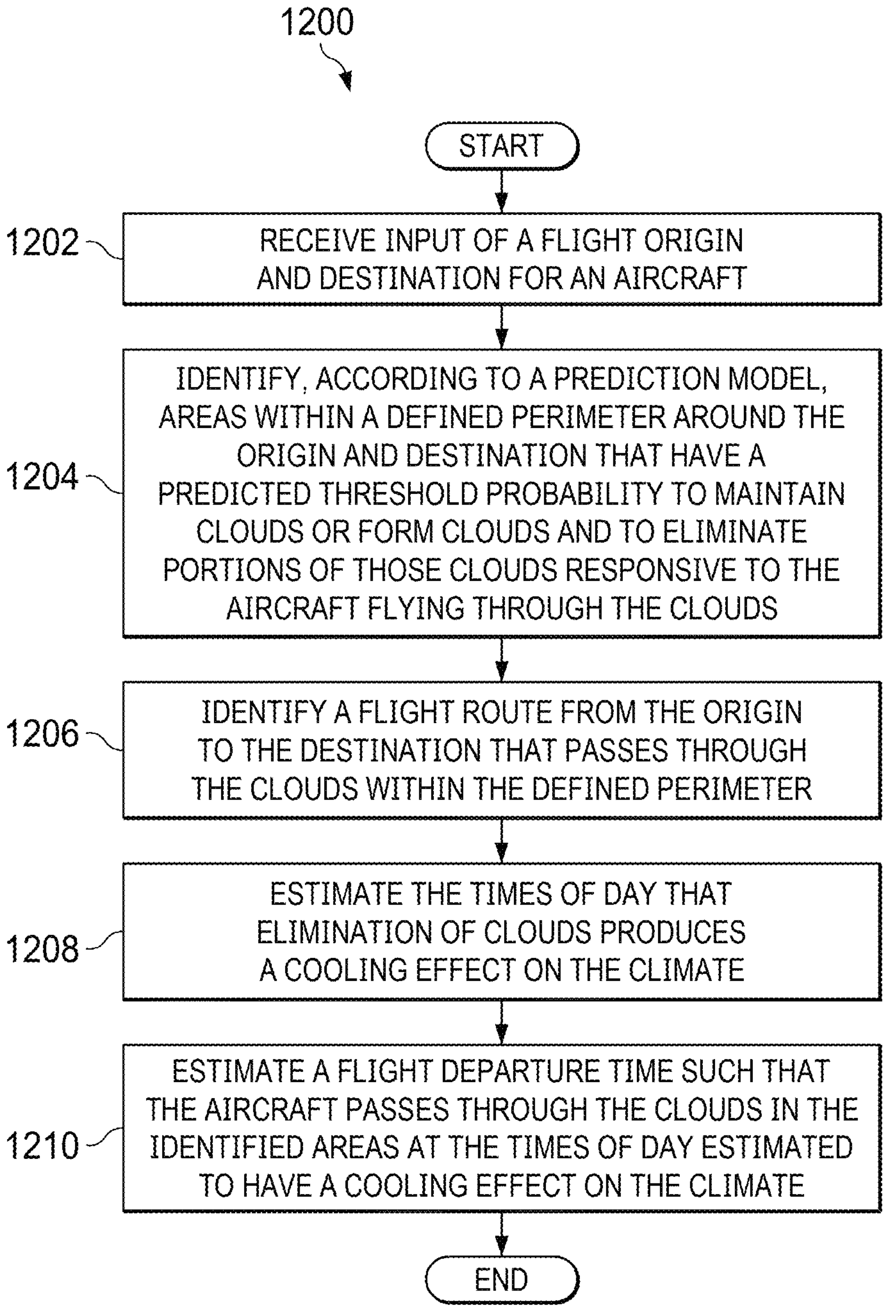
FIG. 12 depicts a flowchart illustrating an alternated process for determining an aircraft route to produce climate cooling in accordance with an illustrative embodiment.

FIG. 12 depicts a flowchart illustrating an alternated process for determining an aircraft route to produce climate cooling in accordance with an illustrative embodiment. Process 1200 can be implemented in aircraft routing system 100.

Process 1200 begins by receiving input of a flight origin and destination (operation 1202). Process 1100 identifies, according to a prediction model, areas within a defined perimeter around the origin and destination that have a predicted threshold probability to maintain clouds or form clouds and to eliminate portions of those clouds responsive to the aircraft flying through the clouds (operation 1204). The identified areas within the defined perimeter may comprise a three-dimensional map of predicted energy forcing values. The three-dimensional map may display predicted energy forcing values as a function of time. The prediction model may use at least one of weather data, aircraft aerodynamics, aircraft engine properties, flight times, and altitude. The weather data may comprise at least one of air temperature, air humidity, windspeed, air pressure, air density, cloud and fog coverage, cloud and fog infrared and optical properties, aerosol concentrations, or aerosol infrared and optical properties.

A flight route from the origin to the destination is identified that passes through the clouds within the defined perimeter (operation 1206).

Process 1200 estimates the times of day that elimination of clouds produces a cooling effect on the climate (operation 1208) and then estimates a flight departure time such that the aircraft passes through the clouds in the identified areas at the times of day estimated to have a cooling effect on the climate (operation 1210). Estimating the times of day that elimination of clouds produces a cooling effect on the climate may be based on at least one of terrestrial data or space data. Terrestrial data may comprise at least one of surface emissivity or surface albedo. Space data may comprise at least one of solar irradiance, sunspots, solar flares, moon orbit location, or solar eclipse.

Information for the identified flight route can be communicated to an air carrier for implementation, based on the determined flight time through the identified areas, time of day the aircraft is in the identified areas, and cruising altitude, and the flight route that will produce a negative net climate energy forcing value. The flight route information communicated to the air carrier might further comprise information including one or more of a departure time, flight time through the defined areas, time of day the aircraft is in the identified areas, and cruising altitude which differ from the air carrier's planned departure time, planned cruising altitude, and planned flight route relative to the identified areas when implementing the identified flight route.

Process 1200 then ends.

Figure 13:
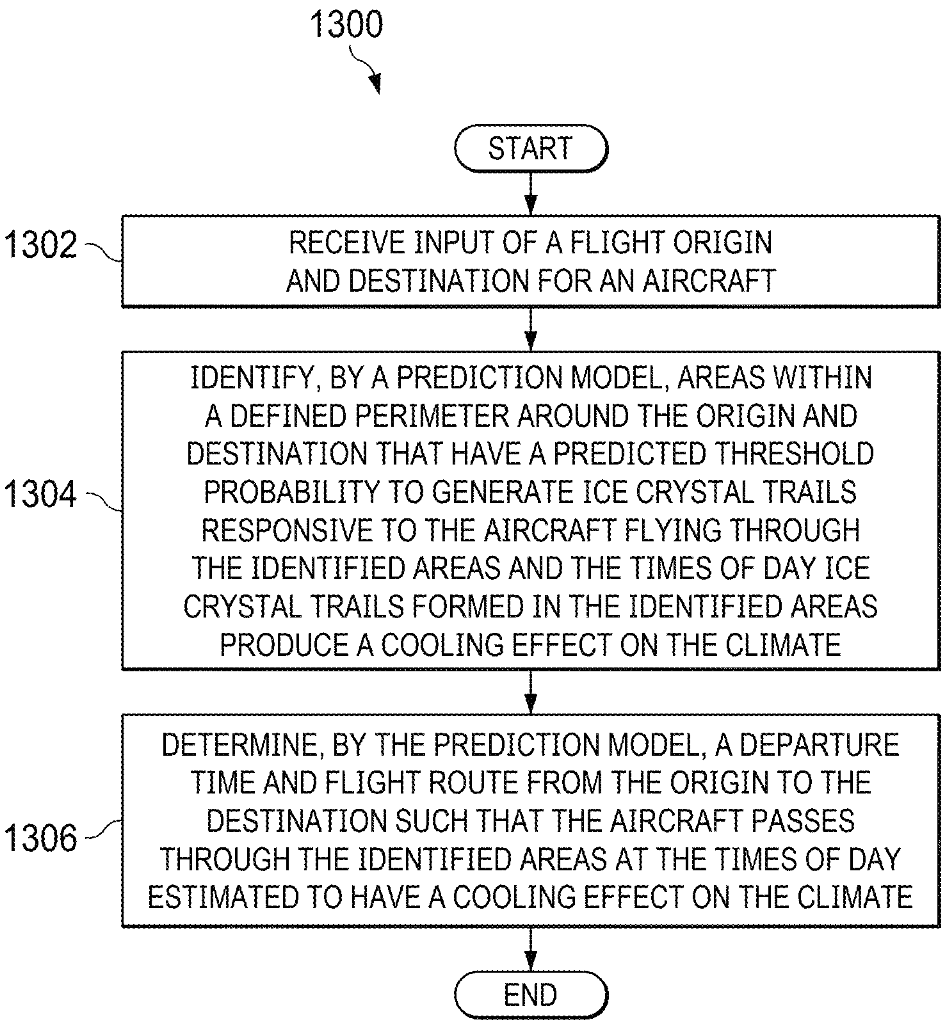
FIG. 13 depicts a flowchart illustrating an alternated process for determining an aircraft route to produce climate cooling in accordance with an illustrative embodiment.

FIG. 13 depicts a flowchart illustrating an alternated process for determining an aircraft route to produce climate cooling in accordance with an illustrative embodiment. Process 1300 can be implemented in aircraft routing system 100.

Process 1300 begins by receiving input of a flight origin and destination (operation 1302). A prediction model identifies areas within a defined perimeter around the origin and destination that have a predicted threshold probability to generate ice crystal trails responsive to the aircraft flying through the identified areas and the times of day ice crystal trails formed in the identified areas produce a cooling effect on the climate (operation 1304).

The prediction model determines a departure time and flight route from the origin to the destination such that the aircraft passes through the identified areas at the times of day estimated to have a cooling effect on the climate (operation 1306). Process 1300 then ends.

Figure 14:
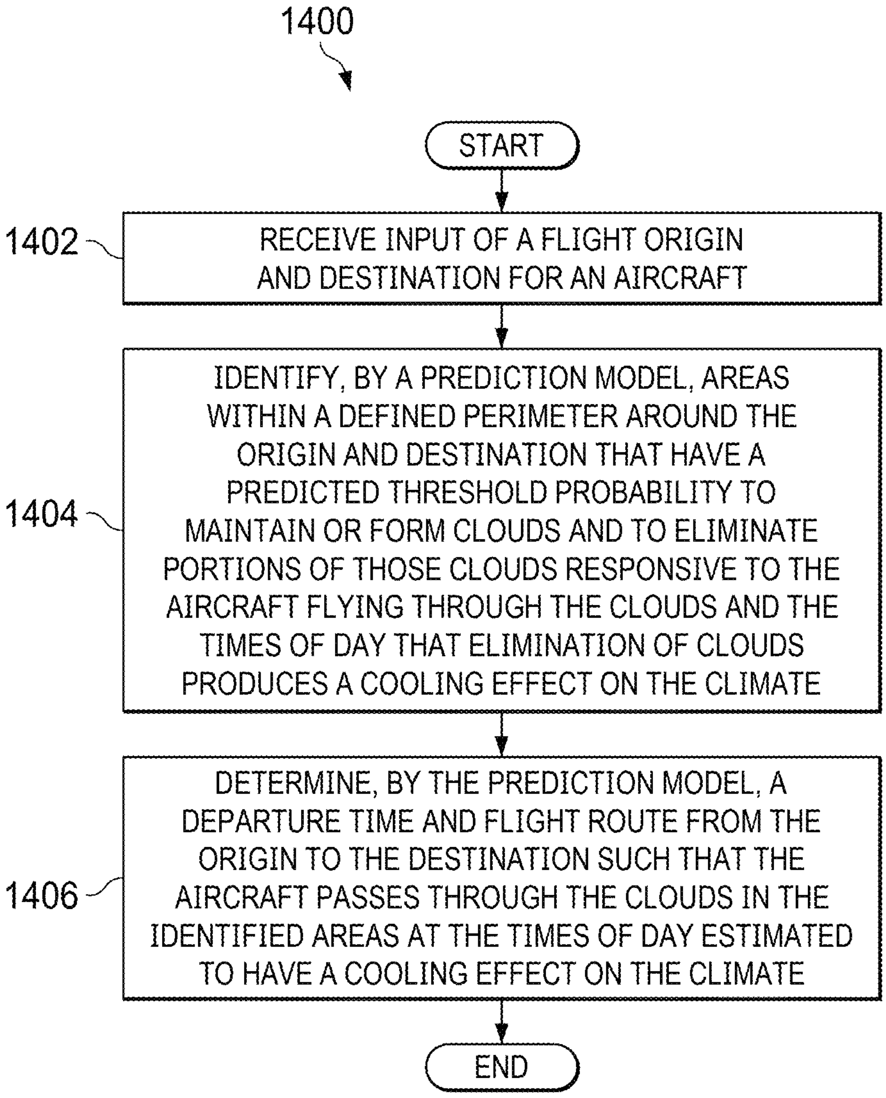
FIG. 14 depicts a flowchart illustrating an alternated process for determining an aircraft route to produce climate cooling in accordance with an illustrative embodiment.

FIG. 14 depicts a flowchart illustrating an alternated process for determining an aircraft route to produce climate cooling in accordance with an illustrative embodiment. Process 1400 can be implemented in aircraft routing system 100.

Process 1400 begins by receiving input of a flight origin and destination (operation 1402). A prediction model identifies areas within a defined perimeter around the origin and destination that have a predicted threshold probability to maintain or form clouds and to eliminate portions of those clouds responsive to the aircraft flying through the clouds and the times of day that elimination of clouds produces a cooling effect on the climate (operation 1404).

The prediction model determines a departure time and flight route from the origin to the destination such that the aircraft passes through the clouds in the identified areas at the times of day estimated to have a cooling effect on the climate (operation 1406). Process 1400 then ends.

Figure 15:
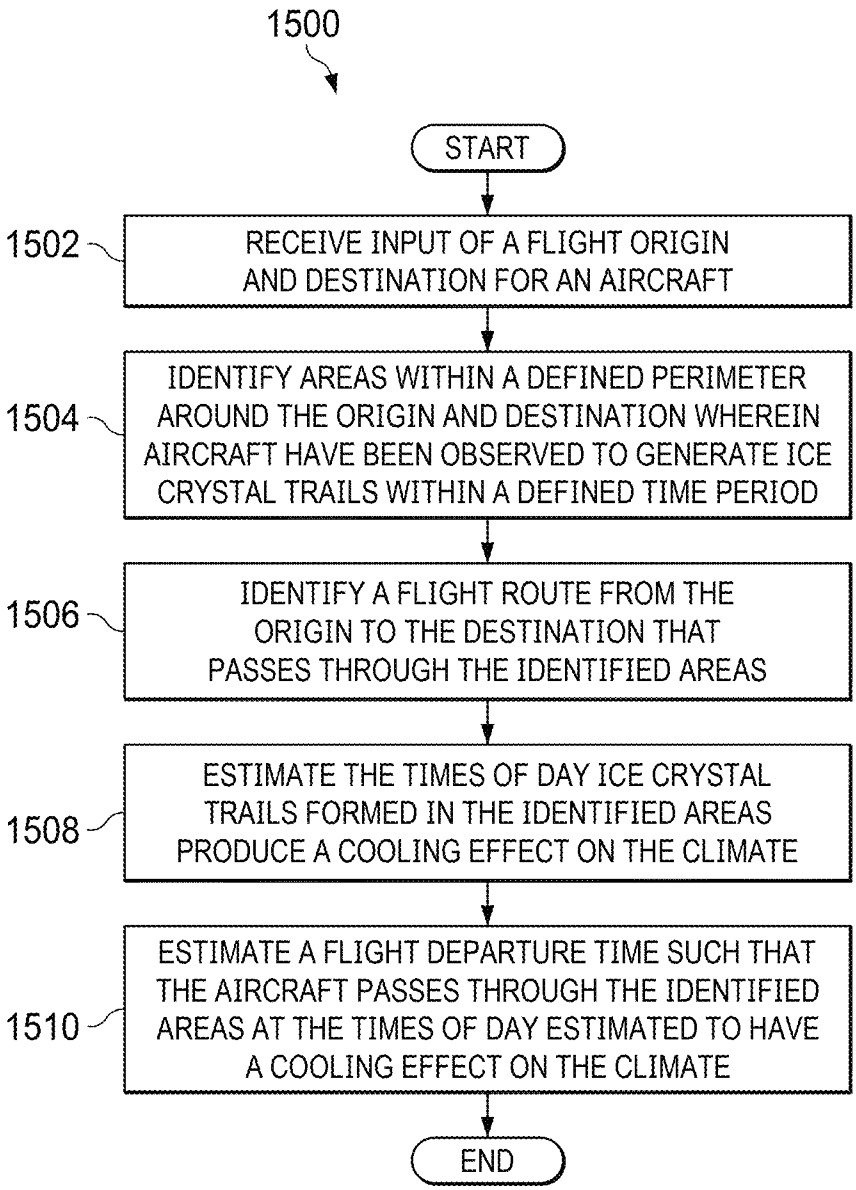
FIG. 15 depicts a flowchart illustrating an alternated process for determining an aircraft route to produce climate cooling in accordance with an illustrative embodiment.

FIG. 15 depicts a flowchart illustrating an alternated process for determining an aircraft route to produce climate cooling in accordance with an illustrative embodiment. Process 1500 can be implemented in aircraft routing system 100.

Process 1500 begins by receiving input of a flight origin and destination (operation 1502). Areas within a defined perimeter around the origin and destination are identified where aircraft have been observed to generate ice crystal trails within a defined time period (operation 1504).

A flight route from the origin to the destination is identified that passes through the identified areas (operation 1506).

Process 1500 estimates the times of day ice crystal trails formed in the identified areas produce a cooling effect on the climate (operation 1508) and then estimates a flight departure time such that the aircraft passes through the identified areas at the times of day estimated to have a cooling effect on the climate (operation 1510). Process 1500 then ends.

Figure 16:
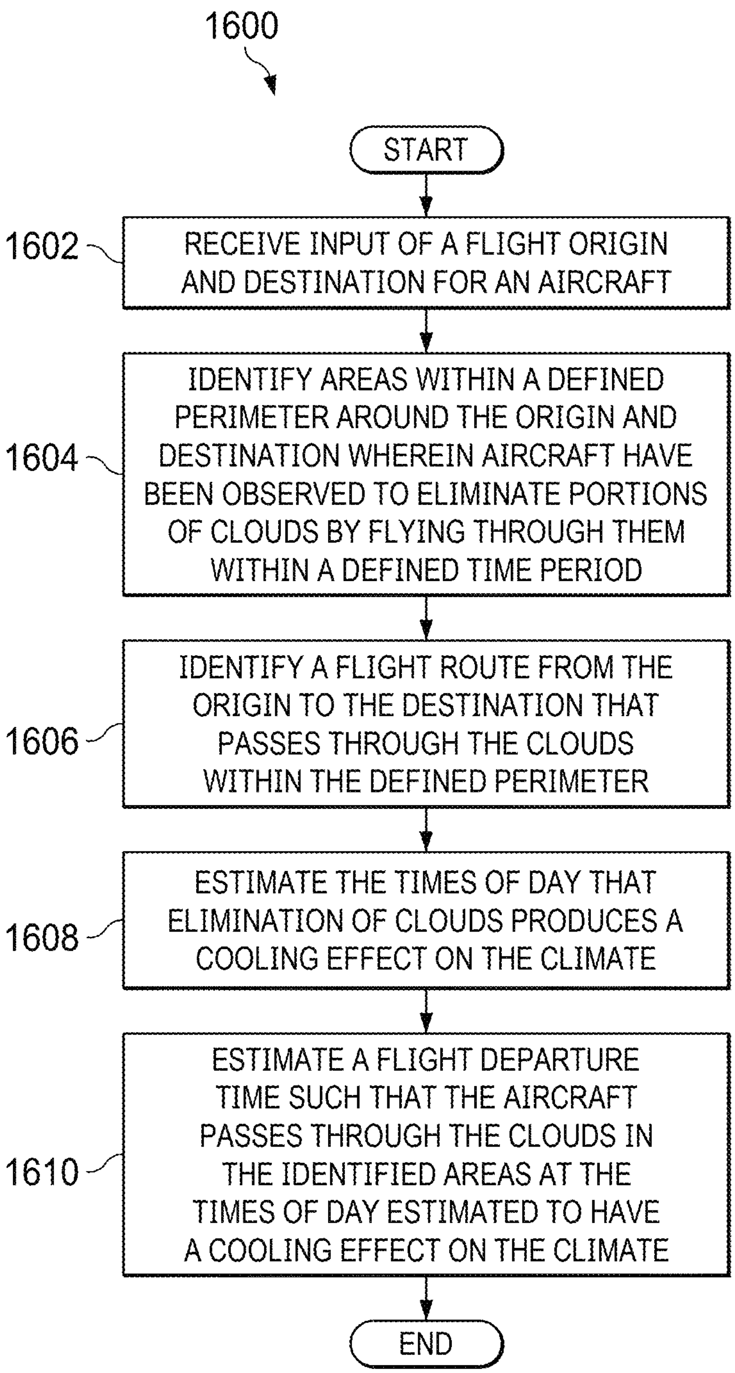
FIG. 16 depicts a flowchart illustrating an alternated process for determining an aircraft route to produce climate cooling in accordance with an illustrative embodiment.

FIG. 16 depicts a flowchart illustrating an alternated process for determining an aircraft route to produce climate cooling in accordance with an illustrative embodiment. Process 1600 can be implemented in aircraft routing system 100.

Process 1600 begins by receiving input of a flight origin and destination (operation 1602). Areas within a defined perimeter around the origin and destination are identified wherein aircraft have been observed to eliminate portions of clouds by flying through them within a defined time period (operation 1604).

A flight route from the origin to the destination is identified that passes through the clouds within the defined perimeter (operation 16206).

Process 1600 estimates the times of day that elimination of clouds produces a cooling effect on the climate (operation 1608) and then estimates a flight departure time such that the aircraft passes through the clouds in the identified areas at the times of day estimated to have a cooling effect on the climate (operation 1610). Process 1600 then ends.

Figure 17:
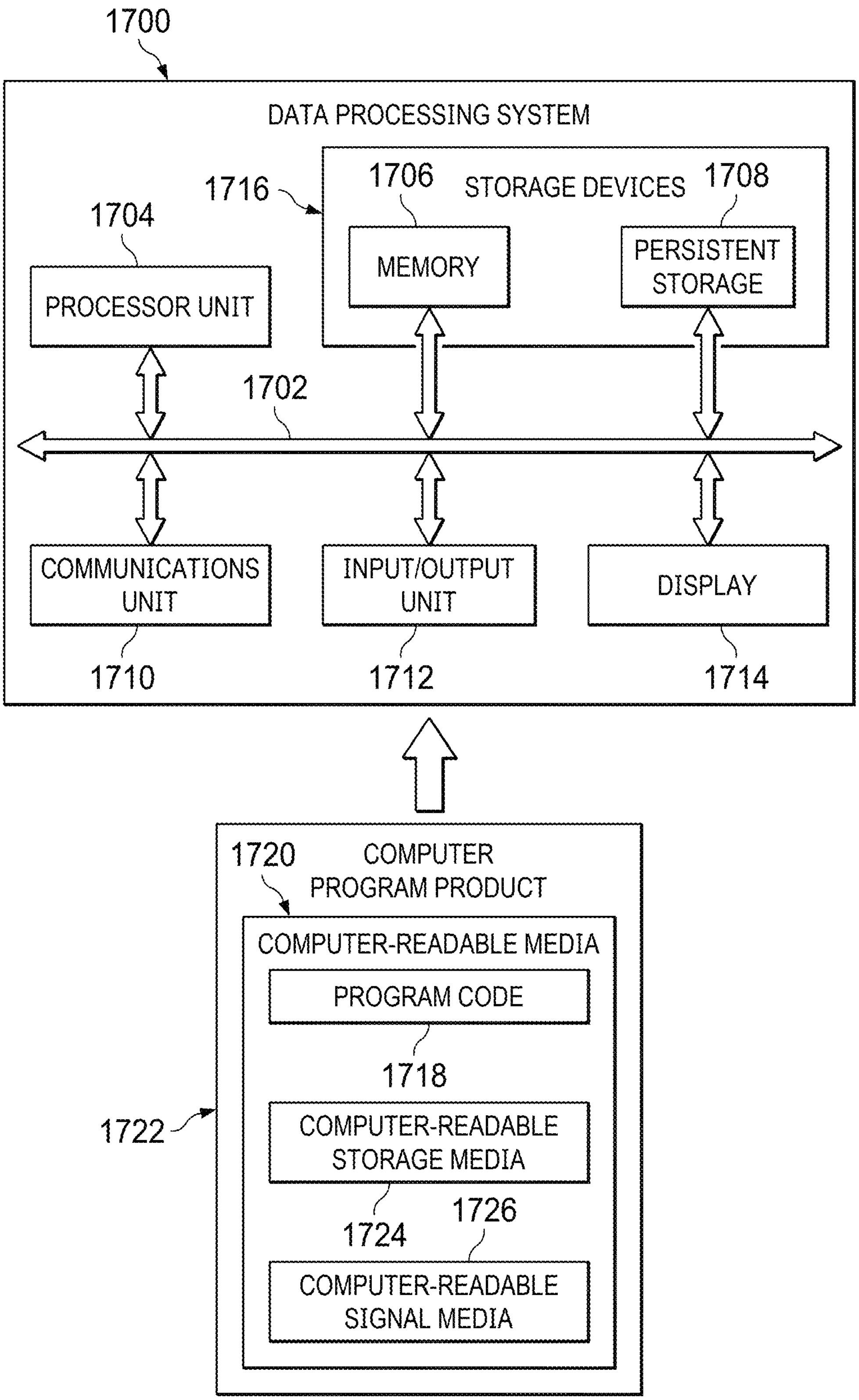
FIG. 17 is an illustration of a block diagram of a data processing system in accordance with an illustrative embodiment.

Turning now to FIG. 17, an illustration of a block diagram of a data processing system is depicted in accordance with an illustrative embodiment. Data processing system 1700 may be used to implement computer system 150 in FIG. 1. In this illustrative example, data processing system 1700 includes communications framework 1702, which provides communications between processor unit 1704, memory 1706, persistent storage 1708, communications unit 1710, input/output (I/O) unit 1712, and display 1714. In this example, communications framework 1702 takes the form of a bus system.

Processor unit 1704 serves to execute instructions for software that may be loaded into memory 1706. Processor unit 1704 may be a number of processors, a multi-processor core, or some other type of processor, depending on the particular implementation. In an embodiment, processor unit 1704 comprises one or more conventional general-purpose central processing units (CPUs). In an alternate embodiment, processor unit 1704 comprises one or more graphical processing units (GPUs).

Memory 1706 and persistent storage 1708 are examples of storage devices 1716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1716 may also be referred to as computer-readable storage devices in these illustrative examples. Memory 1706, in these examples, may be, for example, a random access memory or any other suitable volatile or non-volatile storage device. Persistent storage 1708 may take various forms, depending on the particular implementation.

For example, persistent storage 1708 may contain one or more components or devices. For example, persistent storage 1708 may be a hard drive, a flash memory, a rewritable optical disk, a rewritable magnetic tape, or some combination of the above. The media used by persistent storage 1708 also may be removable. For example, a removable hard drive may be used for persistent storage 1708. Communications unit 1710, in these illustrative examples, provides for communications with other data processing systems or devices. In these illustrative examples, communications unit 1710 is a network interface card.

Input/output unit 1712 allows for input and output of data with other devices that may be connected to data processing system 1700. For example, input/output unit 1712 may provide a connection for user input through at least one of a keyboard, a mouse, or some other suitable input device. Further, input/output unit 1712 may send output to a printer. Display 1714 provides a mechanism to display information to a user.

Instructions for at least one of the operating system, applications, or programs may be located in storage devices 1716, which are in communication with processor unit 1704 through communications framework 1702. The processes of the different embodiments may be performed by processor unit 1704 using computer-implemented instructions, which may be located in a memory, such as memory 1706.

These instructions are referred to as program code, computer-usable program code, or computer-readable program code that may be read and executed by a processor in processor unit 1704. The program code in the different embodiments may be embodied on different physical or computer-readable storage media, such as memory 1706 or persistent storage 1708.

Program code 1718 is located in a functional form on computer-readable media 1720 that is selectively removable and may be loaded onto or transferred to data processing system 1700 for execution by processor unit 1704. Program code 1718 and computer-readable media 1720 form computer program product 1722 in these illustrative examples. In one example, computer-readable media 1720 may be computer-readable storage media 1724 or computer-readable signal media 1726.

In these illustrative examples, computer-readable storage media 1724 is a physical or tangible storage device used to store program code 1718 rather than a medium that propagates or transmits program code 1718. Computer readable storage media 1724, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1718 may be transferred to data processing system 1700 using computer-readable signal media 1726. Computer-readable signal media 1726 may be, for example, a propagated data signal containing program code 1718. For example, computer-readable signal media 1726 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1700 are not meant to provide architectural limitations to the manner in which different embodiments may be implemented. The different illustrative embodiments may be implemented in a data processing system including components in addition to or in place of those illustrated for data processing system 1700. Other components shown in FIG. 17 can be varied from the illustrative examples shown. The different embodiments may be implemented using any hardware device or system capable of running program code 1718.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

As used herein, "a number of" when used with reference to items, means one or more items. For example, "a number of different types of networks" is one or more different types of networks. In illustrative example, a "set of" as used with reference items means one or more items. For example, a set of metrics is one or more of the metrics.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Some features of the illustrative examples are described in the following clauses. These clauses are examples of features and are not intended to limit other illustrative examples.

Clause 1

A method of determining an aircraft route to produce climate cooling, the method comprising:

receiving input of a flight origin and destination for an aircraft;

identifying, according to a prediction model, areas within a defined perimeter around the origin and destination that have a predicted threshold probability to generate ice crystal trails responsive to the aircraft flying through the identified areas;

identifying a flight route from the origin to the destination that passes through the identified areas;

estimating the times of day ice crystal trails formed in the identified areas produce a cooling effect on the climate; and estimating a flight departure time such that the aircraft passes through the identified areas at the times of day estimated to have a cooling effect on the climate.

Clause 2

The method of clause 1, further comprising communicating information for the identified flight route to an air carrier for implementation, based on determined flight time through the identified areas, time of day the aircraft is in the identified areas, and cruising altitude, and the flight route that will produce a negative net climate energy forcing value.

Clause 3

The method of clause 2, wherein the information for the identified flight route communicated to the air carrier can further comprise information including one or more of a departure time, flight time through the defined areas, time of day the aircraft is in the identified areas, and cruising altitude which differ from the air carrier's planned departure time, planned cruising altitude, and planned flight route relative to the identified areas when implementing the identified flight route.

Clause 4

The method of clause 1, wherein the identified areas within the defined perimeter comprise a three-dimensional map of predicted energy forcing values.

Clause 5

The method of clause 4, wherein the three-dimensional map displays predicted energy forcing values as a function of time.

Clause 6

The method of clause 1, wherein input data for the prediction model comprises existing ice crystal trail size, shape, thickness, optical properties, and infrared properties, and how all five of these properties change over time.

Clause 7

The method of clause 1, wherein the prediction model uses at least one of weather data, aircraft aerodynamics, aircraft engine properties, flight times, and altitude.

Clause 8

The method of clause 7, wherein the weather data comprises at least one of air temperature, air humidity, windspeed, air pressure, air density, cloud and fog coverage, cloud and fog infrared and optical properties, aerosol concentrations, or aerosol infrared and optical properties.

Clause 9

The method of clause 1, wherein estimating the times of day ice crystal trails formed in the identified areas produce a cooling effect on the climate is based on at least one of terrestrial data or space data.

Clause 10

The method of clause 9, wherein terrestrial data comprises at least one of surface emissivity or surface albedo.

Clause 11

The method of clause 9, wherein space data comprises at least one of solar irradiance, sunspots, solar flares, moon orbit location, or solar eclipses.

Clause 12

The method of clause 1, wherein the flight route comprises at least one of direct nonrepeat, direct repeat, or indirect repeat.

Clause 13

A system for determining an aircraft route to produce climate cooling, the system comprising:

a storage device that stores program instructions;

one or more processors operably connected to the storage device and configured to execute the program instructions to cause the system to:

receive input of a flight origin and destination for an aircraft;

identify, according to a prediction model, areas within a defined perimeter around the origin and destination that have a predicted threshold probability to generate ice crystal trails responsive to the aircraft flying through the identified areas;

identify a flight route from the origin to the destination that passes through the identified areas;

estimate the times of day ice crystal trails formed in the identified areas produce a cooling effect on the climate; and estimate a flight departure time such that the aircraft passes through the identified areas at the times of day estimated to have a cooling effect on the climate.

Clause 14

The system of clause 13, wherein the processors further execute program instructions to cause the system to communicate information for the identified flight route to an air carrier for implementation, based on determined flight time through the identified areas, time of day the aircraft is in the identified areas, and cruising altitude, and the flight route that will produce a negative net climate energy forcing value.

Clause 15

The system of clause 14, wherein the information for the identified flight route communicated to the air carrier can further comprise information including one or more of a departure time, flight time through the defined areas, time of day the aircraft is in the identified areas, and cruising altitude which differ from the air carrier's planned departure time, planned cruising altitude, and planned flight route relative to the identified areas when implementing the identified flight route.

Clause 16

The system of clause 13, wherein the identified areas within the defined perimeter comprise a three-dimensional map of predicted energy forcing values.

Clause 17

The system of clause 16, wherein the three-dimensional map displays predicted energy forcing values as a function of time.

Clause 18

The system of clause 13, wherein input data for the prediction model can comprise existing ice crystal trail size, shape, thickness, optical properties, and infrared properties, and how all five of these properties change over time.

Clause 19

The system of clause 13, wherein the prediction model uses at least one of weather data, aircraft aerodynamics, aircraft engine properties, flight times, and altitude.

Clause 20

The system of clause 19, wherein the weather data comprises at least one of air temperature, air humidity, windspeed, air pressure, air density, cloud and fog coverage, cloud and fog infrared and optical properties, aerosol concentrations, or aerosol infrared and optical properties.

Clause 21

The system of clause 13, wherein estimating the times of day ice crystal trails formed in the identified areas produce a cooling effect on the climate is based on at least one of terrestrial data or space data.

Clause 22

The system of clause 21, wherein terrestrial data comprises at least one of surface emissivity or surface albedo.

Clause 23

The system of clause 21, wherein space data comprises at least one of solar irradiance, sunspots, solar flares, moon orbit location, or solar eclipses.

Clause 24

The system of clause 13, wherein the flight route comprises at least one of direct nonrepeat, direct repeat, or indirect repeat.

Clause 25

A method of determining an aircraft route to produce climate cooling, the method comprising:

receiving input of a flight origin and destination for an aircraft;

identifying, according to a prediction model, areas within a defined perimeter around the origin and destination that have a predicted threshold probability to maintain clouds or form clouds and to eliminate portions of those clouds responsive to the aircraft flying through the clouds;

identifying a flight route from the origin to the destination that passes through the clouds within the defined perimeter;

estimating the times of day that elimination of clouds produces a cooling effect on the climate; and estimating a flight departure time such that the aircraft passes through the clouds in the identified areas at the times of day estimated to have a cooling effect on the climate.

Clause 26

The method of clause 25, further comprising communicating information for the identified flight route to an air carrier for implementation, based on determined flight time through the identified areas, time of day the aircraft is in the identified areas, and cruising altitude, and the flight route that will produce a negative net climate energy forcing value.

Clause 27

The method of clause 26, wherein the information for the identified flight route communicated to the air carrier can further comprise information including one or more of a departure time, flight time through the defined areas, time of day the aircraft is in the identified areas, and cruising altitude which differ from the air carrier's planned departure time, planned cruising altitude, and planned flight route relative to the identified areas when implementing the identified flight route.

Clause 28

The method of clause 25, wherein the identified areas within the defined perimeter comprise a three-dimensional map of predicted energy forcing values.

Clause 29

The method of clause 28, wherein the three-dimensional map displays predicted energy forcing values as a function of time.

Clause 30

The method of clause 25, wherein the input data for the prediction model comprises existing cloud size, shape, thickness, optical properties, and infrared properties, and existing cloud elimination by aircraft, and how all six of these properties change over time.

Clause 31

The method of clause 25, wherein the prediction model uses at least one of weather data, aircraft aerodynamics, aircraft engine properties, flight times, and altitude.

Clause 32

The method of clause 30, wherein the weather data comprises at least one of air temperature, air humidity, windspeed, air pressure, air density, cloud and fog coverage, cloud and fog infrared and optical properties, aerosol concentrations, or aerosol infrared and optical properties.

Clause 33

The method of clause 25, wherein estimating the times of day that elimination of clouds produces a cooling effect on the climate is based on at least one of terrestrial data or space data.

Clause 34

The method of clause 33, wherein terrestrial data comprises at least one of surface emissivity or surface albedo.

Clause 35

The method of clause 33, wherein space data comprises at least one of solar irradiance, sunspots, solar flares, moon orbit location, or solar eclipses.

Clause 36

The method of clause 25, wherein the flight route comprises at least one of direct nonrepeat, direct repeat, or indirect repeat.

Clause 37

A system for determining an aircraft route to produce climate cooling, the system comprising:

- a storage device that stores program instructions;
- one or more processors operably connected to the storage device and configured to execute the program instructions to cause the system to:
- receive input of a flight origin and destination for an aircraft;
- identify, according to a prediction model, areas within a defined perimeter around the origin and destination that have a predicted threshold probability to maintain clouds or form clouds and to eliminate portions of those clouds responsive to the aircraft flying through the clouds;
- identify a flight route from the origin to the destination that passes through the clouds within the defined perimeter;
- estimate the times of day that elimination of clouds produces a cooling effect on the climate; and
- estimate a flight departure time such that the aircraft passes through the clouds in the identified areas at the times of day estimated to have a cooling effect on the climate.

Clause 38

The system of clause 37, wherein the processors further execute program instructions to cause the system to communicate information for the identified flight route to an air carrier for implementation, based on determined flight time through the identified areas, time of day the aircraft is in the identified areas, and cruising altitude, and the flight route that will produce a negative net climate energy forcing value.

Clause 39

The system of clause 38, wherein the information for the identified flight route communicated to the air carrier can further comprise information including one or more of a departure time, flight time through the defined areas, time of day the aircraft is in the identified areas, and cruising altitude which differ from the air carrier's planned departure time, planned cruising altitude, and planned flight route relative to the identified areas when implementing the identified flight route.

Clause 40

The system of clause 37, wherein the identified areas within the defined perimeter comprise a three-dimensional map of predicted energy forcing values.

Clause 41

The system of clause 40, wherein the three-dimensional map displays predicted energy forcing values as a function of time.

Clause 42

The system of clause 37, wherein the input data for the prediction model comprises existing cloud size, shape, thickness, optical properties, and infrared properties, and existing cloud elimination by aircraft, and how all six of these properties change over time.

Clause 43

The system of clause 37, wherein the prediction model uses at least one of weather data, aircraft aerodynamics, aircraft engine properties, flight times, and altitude.

Clause 44

The system of clause 43, wherein the weather data comprises at least one of air temperature, air humidity, windspeed, air pressure, air density, cloud and fog coverage, cloud and fog infrared and optical properties, aerosol concentrations, or aerosol infrared and optical properties.

Clause 45

The system of clause 43, wherein estimating the times of day that elimination of clouds produces a cooling effect on the climate is based on at least one of terrestrial data or space data.

Clause 46

The system of clause 45, wherein terrestrial data comprises at least one of surface emissivity or surface albedo.

Clause 47

The system of clause 45, wherein space data comprises at least one of solar irradiance, sunspots, solar flares, moon orbit location, or solar eclipses.

Clause 48

The system of clause 37, wherein the flight route comprises at least one of direct nonrepeat, direct repeat, or indirect repeat.

Clause 49

A method of determining an aircraft route to produce climate cooling, the method comprising:

- receiving input of a flight origin and destination for an aircraft;
- identifying, by a prediction model, areas within a defined perimeter around the origin and destination that have a predicted threshold probability to generate ice crystal trails responsive to the aircraft flying through the identified areas and the times of day ice crystal trails formed in the identified areas produce a cooling effect on the climate; and determining, by the prediction model, a departure time and flight route from the origin to the destination such that the aircraft passes through the identified areas at the times of day estimated to have a cooling effect on the climate.

Clause 50

The method of clause 49, further comprising communicating information for the identified flight route to an air carrier for implementation, based on determined flight time through the identified areas, time of day the aircraft is in the identified areas, and cruising altitude, and the flight route that will produce a negative net climate energy forcing value.

Clause 51

The method of clause 50, wherein the information for the identified flight route communicated to the air carrier can further comprise information including one or more of a departure time, flight time through the defined areas, time of day the aircraft is in the identified areas, and cruising altitude which differ from the air carrier's planned departure time, planned cruising altitude, and planned flight route relative to the identified areas when implementing the identified flight route.

Clause 52

The method of clause 49, wherein the identified areas within the defined perimeter comprise a three-dimensional map of predicted energy forcing values.

Clause 53

The method of clause 52, wherein the three-dimensional map displays predicted energy forcing values as a function of time.

Clause 54

The method of clause 49, wherein input data for the prediction model can comprise existing ice crystal trail size, shape, thickness, optical properties, and infrared properties, and how all five of these properties change over time.

Clause 55

The method of clause 49, wherein the prediction model uses at least one of weather data, aircraft aerodynamics, aircraft engine properties, flight times, and altitude.

Clause 56

The method of clause 55, wherein the weather data comprises at least one of air temperature, air humidity, windspeed, air pressure, air density, cloud and fog coverage, cloud and fog infrared and optical properties, aerosol concentrations, or aerosol infrared and optical properties.

Clause 57

The method of clause 49, wherein identifying the times of day ice crystal trails formed in the identified areas produce a cooling effect on the climate is based on at least one of terrestrial data or space data.

Clause 58

The method of clause 57, wherein terrestrial data comprises at least one of surface emissivity or surface albedo.

Clause 59

The method of clause 57, wherein space data comprises at least one of solar irradiance, sunspots, solar flares, moon orbit location, or solar eclipses.

Clause 60

The method of clause 49, wherein the flight route comprises at least one of direct nonrepeat, direct repeat, or indirect repeat.

Clause 61

A system for determining an aircraft route to produce climate cooling, the system comprising:

a storage device that stores program instructions;

one or more processors operably connected to the storage device and configured to execute the program instructions to cause the system to:

receive input of a flight origin and destination for an aircraft;

identify, by a prediction model, areas within a defined perimeter around the origin and destination that have a predicted threshold probability to generate ice crystal trails responsive to the aircraft flying through the identified areas and the times of day ice crystal trails formed in the identified areas produce a cooling effect on the climate; and determine, by the prediction model, a departure time and flight route from the origin to the destination such that the aircraft passes through the identified areas at the times of day estimated to have a cooling effect on the climate.

Clause 62

The system of clause 61, further comprising communicating information for the identified flight route to an air carrier for implementation, based on determined flight time through the identified areas, time of day the aircraft is in the identified areas, and cruising altitude, and the flight route that will produce a negative net climate energy forcing value.

Clause 63

The system of clause 62, wherein the information for the identified flight route communicated to the air carrier can further comprise information including one or more of a departure time, flight time through the defined areas, time of day the aircraft is in the identified areas, and cruising altitude which differ from the air carrier's planned departure time, planned cruising altitude, and planned flight route relative to the identified areas when implementing the identified flight route.

Clause 64

The system of clause 61, wherein the identified areas within the defined perimeter comprise a three-dimensional map of predicted energy forcing values.

Clause 65

The system of clause 64, wherein the three-dimensional map displays predicted energy forcing values as a function of time.

Clause 66

The system of clause 61, wherein input data for the prediction model can comprise existing ice crystal trail size, shape, thickness, optical properties, and infrared properties, and how all five of these properties change over time.

Clause 67

The system of clause 61, wherein the prediction model uses at least one of weather data, aircraft aerodynamics, aircraft engine properties, flight times, and altitude.

Clause 68

The system of clause 67, wherein the weather data comprises at least one of air temperature, air humidity, windspeed, air pressure, air density, cloud and fog coverage, cloud and fog infrared and optical properties, aerosol concentrations, or aerosol infrared and optical properties.

Clause 69

The system of clause 61, wherein identifying the times of day ice crystal trails formed in the identified areas produce a cooling effect on the climate is based on at least one of terrestrial data or space data.

Clause 70

The system of clause 69, wherein terrestrial data comprises at least one of surface emissivity or surface albedo.

Clause 71

The system of clause 69, wherein space data comprises at least one of solar irradiance, sunspots, solar flares, moon orbit location, or solar eclipses.

Clause 72

The system of clause 61, wherein the flight route comprises at least one of direct nonrepeat, direct repeat, or indirect repeat.

Clause 73

A method of determining an aircraft route to produce climate cooling, the method comprising:

- receiving input of a flight origin and destination for an aircraft;
- identifying, by a prediction model, areas within a defined perimeter around the origin and destination that have a predicted threshold probability to maintain or form clouds and to eliminate portions of those clouds responsive to the aircraft flying through the clouds and the times of day that elimination of clouds produces a cooling effect on the climate; and
- determining, by the prediction model, a departure time and flight route from the origin to the destination such that the aircraft passes through the clouds in the identified areas at the times of day estimated to have a cooling effect on the climate.

Clause 74

The method of clause 73, further comprising communicating information for the identified flight route to an air carrier for implementation, based on determined flight time through the identified areas, time of day the aircraft is in the identified areas, and cruising altitude, and the flight route that will produce a negative net climate energy forcing value.

Clause 75

The method of clause 74, wherein the information for the identified flight route communicated to the air carrier can further comprise information including one or more of a departure time, flight time through the defined areas, time of day the aircraft is in the identified areas, and cruising altitude which differ from the air carrier's planned departure time, planned cruising altitude, and planned flight route relative to the identified areas when implementing the identified flight route.

Clause 76

The method of clause 73, wherein the identified areas within the defined perimeter comprise a three-dimensional map of predicted energy forcing values.

Clause 77

The method of clause 76, wherein the three-dimensional map displays predicted energy forcing values as a function of time.

Clause 78

The method of clause 73, wherein the input data for the prediction model comprises existing cloud size, shape, thickness, optical properties, and infrared properties, and existing cloud elimination by aircraft, and how all six of these properties change over time.

Clause 79

The method of clause 73, wherein the prediction model uses at least one of weather data, aircraft aerodynamics, aircraft engine properties, flight times, and altitude.

Clause 80

The method of clause 79, wherein the weather data comprises at least one of air temperature, air humidity, windspeed, air pressure, air density, cloud and fog coverage, cloud and fog infrared and optical properties, aerosol concentrations, or aerosol infrared and optical properties.

Clause 81

The method of clause 73, wherein estimating the times of day that elimination of clouds produces a cooling effect on the climate is based on at least one of terrestrial data or space data.

Clause 82

The method of clause 81, wherein terrestrial data comprises at least one of surface emissivity or surface albedo.

Clause 83

The method of clause 81, wherein space data comprises at least one of solar irradiance, sunspots, solar flares, moon orbit location, or solar eclipses.

Clause 84

The method of clause 73, wherein the flight route comprises at least one of direct nonrepeat, direct repeat, or indirect repeat.

Clause 85

A system for determining an aircraft route to produce climate cooling, the system comprising:

- a storage device that stores program instructions;
- one or more processors operably connected to the storage device and configured to execute the program instructions to cause the system to:
- receiving input of a flight origin and destination for an aircraft;
- identify, by a prediction model, areas within a defined perimeter around the origin and destination that have a predicted threshold probability to maintain or form clouds and to eliminate portions of those clouds responsive to the aircraft flying through the clouds and the times of day that elimination of clouds produces a cooling effect on the climate; and
- determine, by the prediction model, a departure time and flight route from the origin to the destination such that the aircraft passes through the clouds in the identified areas at the times of day estimated to have a cooling effect on the climate.

Clause 86

The system of clause 85, wherein the processors further execute program instructions to cause the system to communicate information for the identified flight route to an air carrier for implementation, based on determined flight time through the identified areas, time of day the aircraft is in the identified areas, and cruising altitude, and the flight route that will produce a negative net climate energy forcing value.

Clause 87

The system of clause 86, wherein the information for the identified flight route communicated to the air carrier can further comprise information including one or more of a departure time, flight time through the defined areas, time of day the aircraft is in the identified areas, and cruising altitude which differ from the air carrier's planned departure time, planned cruising altitude, and planned flight route relative to the identified areas when implementing the identified flight route.

Clause 88

The system of clause 85, wherein the identified areas within the defined perimeter comprise a three-dimensional map of predicted energy forcing values.

Clause 89

The system of clause 88, wherein the three-dimensional map displays predicted energy forcing values as a function of time.

Clause 90

The system of clause 85, wherein the input data for the prediction model comprises existing cloud size, shape, thickness, optical properties, and infrared properties, and existing cloud elimination by aircraft, and how all six of these properties change over time.

Clause 91

The system of clause 85, wherein the prediction model uses at least one of weather data, aircraft aerodynamics, aircraft engine properties, flight times, and altitude.

Clause 92

The system of clause 91, wherein the weather data comprises at least one of air temperature, air humidity, windspeed, air pressure, air density, cloud and fog coverage, cloud and fog infrared and optical properties, aerosol concentrations, or aerosol infrared and optical properties.

Clause 93

The system of clause 85, wherein identifying the times of day that elimination of clouds produces a cooling effect on the climate is based on at least one of terrestrial data or space data.

Clause 94

The system of clause 93, wherein terrestrial data comprises at least one of surface emissivity or surface albedo.

Clause 95

The system of clause 93, wherein space data comprises at least one of solar irradiance, sunspots, solar flares, moon orbit location, or solar eclipses.

Clause 96

The system of clause 85, wherein the flight route comprises at least one of direct nonrepeat, direct repeat, or indirect repeat.

Clause 97

A method of determining an aircraft route to produce climate cooling, the method comprising:

- receiving input of a flight origin and destination for an aircraft;
- identifying areas within a defined perimeter around the origin and destination wherein aircraft have been observed to generate ice crystal trails with a defined time period;
- identifying a flight route from the origin to the destination that passes through the identified areas;
- estimating the times of day ice crystal trails formed in the identified areas produce a cooling effect on the climate; and
- estimating a flight departure time such that the aircraft passes through the identified areas at the times of day estimated to have a cooling effect on the climate.

Clause 98

The method of clause 97, further comprising communicating information for the identified flight route to an air carrier for implementation, based on determined flight time through the identified areas, time of day the aircraft is in the identified areas, and cruising altitude, and the flight route that will produce a negative net climate energy forcing value.

Clause 99

The method of clause 98, wherein the information for the identified flight route communicated to the air carrier can further comprise information including one or more of a departure time, flight time through the defined areas, time of day the aircraft is in the identified areas, and cruising altitude which differ from the air carrier's planned departure time, planned cruising altitude, and planned flight route relative to the identified areas when implementing the identified flight route.

Clause 100

The method of clause 98, wherein input data based on observations comprise existing ice crystal trail size, shape, thickness, optical properties, and infrared properties, and how all five of these properties change over time.

Clause 101

The method of clause 97, wherein estimating the times of day ice crystal trails formed in the identified areas produce a cooling effect on the climate is based on at least one of terrestrial data or space data.

Clause 102

The method of clause 101, wherein terrestrial data comprises at least one of surface emissivity or surface albedo.

Clause 103

The method of clause 101, wherein space data comprises at least one of solar irradiance, sunspots, solar flares, moon orbit location, or solar eclipses.

Clause 104

The method of clause 97, wherein the flight route comprises at least one of direct nonrepeat, direct repeat, or indirect repeat.

Clause 105

A system for determining an aircraft route to produce climate cooling, the system comprising:

- a storage device that stores program instructions;
- one or more processors operably connected to the storage device and configured to execute the program instructions to cause the system to:
- receive input of a flight origin and destination for an aircraft;
- receive input of areas identified within a defined perimeter around the origin and destination wherein aircraft have been observed to generate ice crystal trails with a defined time period;
- identify a flight route from the origin to the destination that passes through the identified areas;
- estimate the times of day ice crystal trails formed in the identified areas produce a cooling effect on the climate; and
- estimate a flight departure time such that the aircraft passes through the identified areas at the times of day estimated to have a cooling effect on the climate.

Clause 106

The system of clause 105, further comprising communicating information for the identified flight route to an air carrier for implementation, based on determined flight time through the identified areas, time of day the aircraft is in the identified areas, and cruising altitude, and the flight route that will produce a negative net climate energy forcing value.

Clause 107

The system of clause 106, wherein the information for the identified flight route communicated to the air carrier can further comprise information including one or more of a departure time, flight time through the defined areas, time of day the aircraft is in the identified areas, and cruising altitude which differ from the air carrier's planned departure time, planned cruising altitude, and planned flight route relative to the identified areas when implementing the identified flight route.

Clause 108

The system of clause 105, wherein input data based on observations comprise existing ice crystal trail size, shape, thickness, optical properties, and infrared properties, and how all five of these properties change over time.

Clause 109

The system of clause 105, wherein estimating the times of day ice crystal trails formed in the identified areas produce a cooling effect on the climate is based on at least one of terrestrial data or space data.

Clause 110

The system of clause 109, wherein terrestrial data comprises at least one of surface emissivity or surface albedo.

Clause 111

The system of clause 109, wherein space data comprises at least one of solar irradiance, sunspots, solar flares, moon orbit location, or solar eclipses.

Clause 112

The system of clause 105, wherein the flight route comprises at least one of direct nonrepeat, direct repeat, or indirect repeat.

Clause 113

A method of determining an aircraft route to produce climate cooling, the method comprising:

- receiving input of a flight origin and destination for an aircraft;
- identifying areas within a defined perimeter around the origin and destination wherein aircraft have been observed to eliminate portions of clouds by flying through them within a define time period;
- identifying a flight route from the origin to the destination that passes through the clouds within the defined perimeter;
- estimating the times of day that elimination of clouds produces a cooling effect on the climate; and
- estimating a flight departure time such that the aircraft passes through the clouds in the identified areas at the times of day estimated to have a cooling effect on the climate.

Clause 114

The method of clause 113, further comprising communicating information for the identified flight route to an air carrier for implementation, based on determined flight time through the identified areas, time of day the aircraft is in the identified areas, and cruising altitude, and the flight route that will produce a negative net climate energy forcing value.

Clause 115

The method of clause 114, wherein the information for the identified flight route communicated to the air carrier can further comprise information including one or more of a departure time, flight time through the defined areas, time of day the aircraft is in the identified areas, and cruising altitude which differ from the air carrier's planned departure time, planned cruising altitude, and planned flight route relative to the identified areas when implementing the identified flight route.

Clause 116

The method of clause 113, wherein input data based on observations comprise existing cloud size, shape, thickness, optical properties, and infrared properties, and existing cloud elimination by aircraft, and how all six of these properties change over time.

Clause 117

The method of clause 113, wherein estimating the times of day that elimination of clouds produces a cooling effect on the climate is based on at least one of terrestrial data or space data.

Clause 118

The method of clause 117, wherein terrestrial data comprises at least one of surface emissivity or surface albedo.

Clause 119

The method of clause 117, wherein space data comprises at least one of solar irradiance, sunspots, solar flares, moon orbit location, or solar eclipses.

Clause 120

The method of clause 113, wherein the flight route comprises at least one of direct nonrepeat, direct repeat, or indirect repeat.

Clause 121

A system for determining an aircraft route to produce climate cooling, the system comprising:

- a storage device that stores program instructions;
- one or more processors operably connected to the storage device and configured to execute the program instructions to cause the system to:
- receiving input of a flight origin and destination for an aircraft;
- receive input of areas identified within a defined perimeter around the origin and destination wherein aircraft have been observed to eliminate portions of clouds by flying through them within a define time period;
- identifying a flight route from the origin to the destination that passes through the clouds within the defined perimeter;
- estimating the times of day that elimination of clouds produces a cooling effect on the climate; and
- estimating a flight departure time such that the aircraft passes through the clouds in the identified areas at the times of day estimated to have a cooling effect on the climate.

Clause 122

The system of clause 121, further comprising communicating information for the identified flight route to an air carrier for implementation, based on determined flight time through the identified areas, time of day the aircraft is in the identified areas, and cruising altitude, and the flight route that will produce a negative net climate energy forcing value.

Clause 123

The system of clause 122, wherein the information for the identified flight route communicated to the air carrier can further comprise information including one or more of a departure time, flight time through the defined areas, time of day the aircraft is in the identified areas, and cruising altitude which differ from the air carrier's planned departure time, planned cruising altitude, and planned flight route relative to the identified areas when implementing the identified flight route.

Clause 124

The system of clause 121, wherein input data based on observations comprise existing cloud size, shape, thickness, optical properties, and infrared properties, and existing cloud elimination by aircraft, and how all six of these properties change over time.

Clause 125

The system of clause 121, wherein estimating the times of day that elimination of clouds produces a cooling effect on the climate is based on at least one of terrestrial data or space data.

Clause 126

The system of clause 125, wherein terrestrial data comprises at least one of surface emissivity or surface albedo.

Clause 127

The system of clause 125, wherein space data comprises at least one of solar irradiance, sunspots, solar flares, moon orbit location, or solar eclipses.

Clause 128

The system of clause 121, wherein the flight route comprises at least one of direct nonrepeat, direct repeat, or indirect repeat.

What is claimed is:

1. A method of cooling a climate, the method comprising:

receiving input of an origin and a destination for an aircraft;

identifying, according to real-time and historic observations, atmospheric zones favorable to cloud elimination or thinning by an aircraft flying through them, the atmospheric zones being between or within a range of the aircraft from the origin and the destination;

generating, for each one of the atmospheric zones favorable to cloud elimination or thinning, routes of flight comprising respectively, a departure time and a flight route from the origin to the destination that flies through at least one of the each one of the atmospheric zones;

overlaying each flight route and departure time, respectively, on a map of emissivity from a terrain below the route of flight;

estimating an amount of cloud eliminated or thinned, respectively, by each flight route;

applying wind induced drift to clouds eliminated or thinned, respectively, by each flight route;

generating, using the map of emissivity and each flight route, a value of energy forcing, respectively, for each flight route;

estimating, using a prediction model, a nonrepeat energy forcing value for a nonrepeat flight route from the origin to the destination;

defining a cooling route from among the routes of flight comprising the value of energy forcing less than the nonrepeat energy forcing value; and cooling the climate by flying the aircraft along the cooling route.

2. The method of claim 1, further comprising:

the atmospheric zones comprising, respectively, a range of altitudes;

generating the routes of flight in real time after the departure time; and communicating information for the flight route to an air carrier for implementation, the information comprising: a determined flight time through the atmospheric zones, a time of day the aircraft is in the atmospheric zones, and a cruising altitude.

3. The method of claim 2, further comprising communicating to the air carrier for each of the routes of flight one or more of: the departure time, a flight time through the atmospheric zones, a time of day the aircraft is in the atmospheric zones, and a cruising altitude, which differ from an air carrier's planned departure time for the nonrepeat flight route, or a planned cruising altitude for the nonrepeat flight.

4. The method of claim 1, wherein the atmospheric zones comprise a three-dimensional map of predicted energy forcing values.

5. The method of claim 4, wherein the three-dimensional map displays predicted energy forcing values as a function of time.

6. The method of claim 1, wherein input data for generating the atmospheric zones comprises at least one of: existing ice crystal trail size, shape, thickness, optical properties, and infrared properties, and how all five of these properties change over time.

7. The method of claim 1, wherein the prediction model uses at least one of weather data, aircraft aerodynamics, aircraft engine properties, flight times, and altitude.

8. The method of claim 7, wherein the weather data comprises at least one of air temperature, air humidity, windspeed, air pressure, air density, cloud and fog coverage, cloud and fog infrared and optical properties, aerosol concentrations, or aerosol infrared and optical properties.

9. The method of claim 1, further comprising generating the atmospheric zones comprises using space data.

10. The method of claim 9, wherein terrestrial data comprises surface albedo.

11. The method of claim 9, wherein space data comprises at least one of solar irradiance, sunspots, solar flares, moon orbit location, or solar eclipses.

12. The method of claim 1, wherein the flight route comprises at least one of direct repeat, or indirect repeat.

13. A machine configured to cool a climate, wherein the machine comprises:

a storage device that stores program instructions;

one or more processors operably connected to the storage device and configured to execute the program instructions to:

receive input of an origin and a destination for an aircraft;

identify, according to real-time and historic observations, atmospheric zones favorable to cloud elimination or thinning by an aircraft flying through them, the atmospheric zones being between or within a range of the aircraft from the origin and the destination;

generate, for each one of the atmospheric zones favorable to cloud elimination or thinning, routes of flight comprising respectively, a departure time and a flight route from the origin to the destination that flies through at least one of the each one of the atmospheric zones;

overlay each flight route and departure time, respectively, on a map of emissivity from a terrain below the route of flight;

estimate an amount of cloud eliminated or thinned, respectively, by each flight route;

apply wind induced drift to clouds eliminated or thinned, respectively, by each flight route;

generate, using the map of emissivity and each flight route, a value of energy forcing, respectively, for each flight route;

estimate, in a prediction model, a nonrepeat energy forcing value for a nonrepeat flight route from the origin to the destination;

define, in real time, a cooling route from among the routes of flight comprising the value of energy forcing less than the nonrepeat energy forcing value;

a control system in the aircraft configured to receive the cooling route and to fly the aircraft along the cooling route.

14. The machine of claim 13, wherein the processors further execute program instructions to cause the system to communicate information for the cooling route to an air carrier for implementation, wherein the information comprises: a determined flight time through the atmospheric zones, a time of day the aircraft is in the atmospheric zones, and a cruising altitude.

15. The machine of claim 14, wherein the information for the cooling route communicated to the air carrier further comprises for each of the routes of flight one or more of: the departure time, a flight time through the atmospheric zones, a time of day the aircraft is in the atmospheric zones, and a cruising altitude which differ from an air carrier's planned departure time for the nonrepeat flight, or a planned cruising altitude for the nonrepeat flight.

16. The machine of claim 13, wherein the atmospheric zones comprise a three-dimensional map of predicted energy forcing values.

17. The machine of claim 16, wherein the atmospheric zones comprise a three-dimensional map of predicted energy forcing values.

18. The machine of claim 13, wherein input data for generating the atmospheric zones comprises at least one of: existing ice crystal trail size, shape, thickness, optical properties, and infrared properties, and how all five of these properties change over time.

19. The machine of claim 13, wherein the prediction model uses at least one of weather data, aircraft aerodynamics, aircraft engine properties, flight times, and altitude.

20. The machine of claim 19, wherein the weather data comprises at least one of air temperature, air humidity, windspeed, air pressure, air density, cloud and fog coverage, cloud and fog infrared and optical properties, aerosol concentrations, or aerosol infrared and optical properties.

* * * * *